United States Patent [19]
Bach et al.

[11] Patent Number: 5,924,101
[45] Date of Patent: Jul. 13, 1999

[54] USER INTERFACE FOR CREATING CLASS DEFINITIONS AND IMPLEMENTATIONS FOR DATASTORE PERSISTENT OBJECTS

[75] Inventors: Mark Alan Bach, San Jose; Shyh-Mei F. Ho, Cupertino; Kevin Michael McBride, Menlo Park; H. Moncrief Rowe-Anderson, San Jose; Thomas Beavers Sander, Saratoga, all of Calif.

[73] Assignee: International Business Machines Corporation, Armonk, N.Y.

[21] Appl. No.: 08/949,638

[22] Filed: Oct. 14, 1997

[51] Int. Cl.$^6$ .................................................. G06F 17/40
[52] U.S. Cl. ..................... 707/103; 707/102; 395/702; 345/352
[58] Field of Search ................... 707/102, 103; 395/702; 345/352

[56] References Cited

U.S. PATENT DOCUMENTS

| | | | |
|---|---|---|---|
| 5,412,774 | 5/1995 | Agrawal et al. | 345/340 |
| 5,729,739 | 3/1998 | Cantin et al. | 707/103 |
| 5,778,378 | 7/1998 | Rubin | 707/103 |
| 5,805,796 | 9/1998 | Finch et al. | 395/183.16 |
| 5,815,415 | 9/1998 | Bentley et al. | 364/578 |
| 6,513,099 | 3/1997 | Erickson et al. | 395/500 |

OTHER PUBLICATIONS

Pentakalos et al., "Pythia and Pythia/WK: tools for the performance analysis of mass storage systems", Practice and Experience, vol. 27, No. 9, abstract only, Sep. 1997.

Ahad, R., "A methodology for design and documentation of persistent object bases of information systems", Digest of papers—Thirty fifth IEEE Computer Society International Conference, abstract only, Feb. 1990.

*Primary Examiner*—Thomas G. Black
*Assistant Examiner*—Jean R. Homere
*Attorney, Agent, or Firm*—Gates & Cooper

[57] ABSTRACT

A method, apparatus, and article of manufacture for generating class definitions and implementations for datastore persistent objects. A "wizard" or "task guide" is displayed on a monitor attached to a computer, wherein the wizard comprises a step-by-step procedure for creating the class specifications and implementations for the datastore persistent objects. User input is accepted into the computer in response to the step-by-step procedure and the class specifications and implementations for the datastore persistent objects are created using the user input.

36 Claims, 20 Drawing Sheets

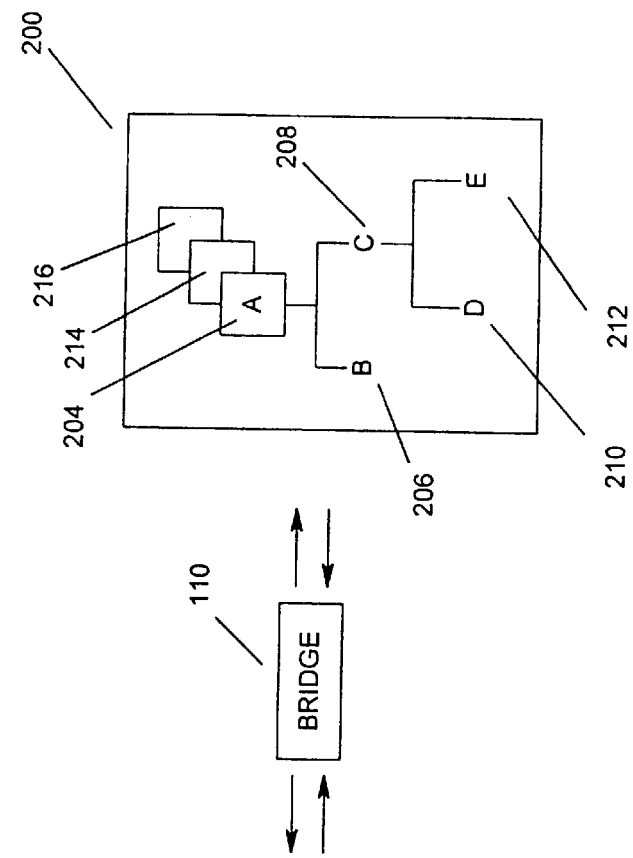
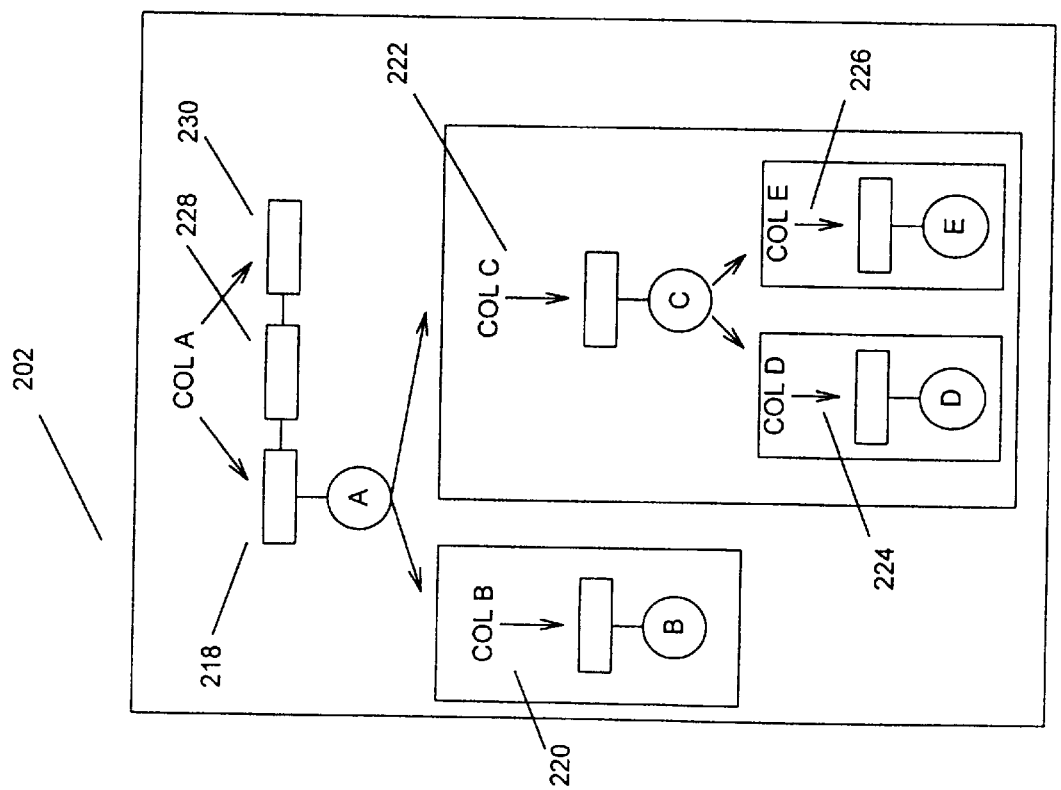
FIG. 2

USER INTERFACE FOR CREATING CLASS DEFINITIONS AND IMPLEMENTATIONS FOR DATASTORE PERSISTENT OBJECTS

CROSS-REFERENCE TO RELATED APPLICATIONS

This application is related to the following and commonly-assigned patent applications:

Application Ser. No. 08/736,762, entitled "A FRAMEWORK FOR OBJECT-ORIENTED ACCESS TO NON-OBJECT-ORIENTED DATASTORES," filed on Oct. 25, 1996, by Kenneth R. Blackman and Jack L. Howe III, now U.S. Pat. No. 5,799,313.

Application Ser. No. 08/736,763, entitled "A METHOD FOR REPRESENTING NON-OBJECT-ORIENTED DATASTORES USING A COLLECTION OF COLLECTIONS DATA MODEL," filed on Oct. 25, 1996, by Kenneth R. Blackman and Jack L. Howe III, now U.S. Pat. No. 5,794,248.

Application Ser. No. 08/738,294, entitled "A METHOD FOR THE INCREMENTAL PRESENTATION OF NON-OBJECT-ORIENTED DATASTORES USING AN OBJECT-ORIENTED QUERYABLE DATASTORE COLLECTION," filed on Oct. 25, 1996, by Kenneth R. Blackman and Jack L. Howe III, now U.S. Pat. No. 5,781,907.

Application Ser. No. 08/738,104, entitled "A QUERY SYNTAX FOR ACCESSING NON-RELATIONAL, NON-OBJECT-ORIENTED DATASTORES," filed on Oct. 25, 1996, by Kenneth R. Blackman and Jack L. Howe III, now U.S. Pat. No. 5,778,379.

Application Ser. No. 08/738,082, entitled "A QUERY PARSER FOR ACCESSING NON-RELATIONAL, NON-OBJECT-ORIENTED DATASTORES," filed on Oct. 25, 1996, by Kenneth R. Blackman and Jack L. Howe III, now U.S. Pat. No. 5,778,358.

Application Ser. No. 08/738,330, entitled "A METHOD FOR USING A DATASTORE CURSOR FOR THE INCREMENTAL PRESENTATION OF QUERY RESULTS WHEN TRAVERSING IMPLIED COLLECTIONS IN NON-OBJECT-ORIENTED DATASTORES," filed on Oct. 25, 1996, by Kenneth R. Blackman and Jack L. Howe III, now U.S. Pat. No. 5,787,436.

Application Ser. No. 08/736,759, entitled "A METHOD FOR REPRESENTING DATA FROM NON-RELATIONAL, NON-OBJECT-ORIENTED DATASTORES AS QUERYABLE DATASTORE PERSISTENT OBJECTS," filed on Oct. 25, 1996, by Kenneth R. Blackman and Jack L. Howe III, now U.S. Pat. No. 5,794,247.

Application Ser. No. 08/736,764, entitled "A METHOD FOR ENCAPSULATING DATA FROM NON-OBJECT-ORIENTED DATASTORES AS DATASTORE PERSISTENT OBJECTS," filed on Oct. 25, 1996, by Kenneth R. Blackman and Jack L. Howe III, now U.S. Pat. No. 5,765,161.

Application Ser. No. 08/738,103, entitled "A METHOD FOR USING QUERYABLE PERSISTENT IDENTIFIERS TO LOCATE DATA FOR DATASTORE PERSISTENT OBJECTS IN NON-OBJECT-ORIENTED DATASTORES," filed on Oct. 25, 1996, by Kenneth R. Blackman and Jack L. Howe III, now U.S. Pat. No. 5,765,161.

Application Ser. No. 08/736,983, entitled "A METHOD FOR INTERFACING QUERYABLE DATASTORE PERSISTENT OBJECTS TO NON-RELATIONAL, NON-OBJECT-ORIENTED DATASTORES," filed on Oct. 25, 1996, by Kenneth R. Blackman and Jack L. Howe now U.S. Pat. No. 5,761,671.

Application Ser. No. 08/736,952, entitled "A METHOD FOR MANAGING QUERYABLE DATASTORE PERSISTENT OBJECTS AND QUERYABLE DATASTORE COLLECTIONS IN AN OBJECT-ORIENTED ENVIRONMENT," filed on Oct. 25, 1996, by Kenneth R. Blackman and Jack L. Howe III, now U.S. Pat. No. 5,765,162.

Application Ser. No. 08/736,765, entitled "A METHOD FOR CATALOGING DATASTORE CHARACTERISTICS AND DEFINING AND GENERATING DATASTORE PERSISTENT OBJECTS," filed on Oct. 25, 1996, by Kenneth R. Blackman and Jack L. Howe III, now U.S. Pat. No. 5,737,597.

Application Ser. No. 08/736,922, entitled "A METHOD FOR CAPTURING AND CATALOGING DATASTORE CHARACTERISTICS TO DEFINE DATASTORE PERSISTENT OBJECTS," filed on Oct. 25, 1996, by Kenneth R. Blackman and Jack L. Howe III, now U.S. Pat. No. 5,809,508.

Application Ser. No. 08/738,102, entitled "A METHOD FOR CAPTURING AND CATALOGING SPECIFICATIONS FOR DATASTORE PERSISTENT CLASSES," filed on Oct. 25, 1996, by Kenneth R. Blackman and Jack L. Howe III, now U.S. Pat. No. 5,737,598.

Application Ser. No. 08/738,105, entitled "A METHOD FOR USING A NON-OBJECT-ORIENTED DATASTORE AS A GENERIC PERSISTENT DATASTORE FOR PERSISTENT OBJECTS," filed on Oct. 25, 1996, by Kenneth R. Blackman and Jack L. Howe III, now U.S. Pat. No. 5,809,509.

Application Ser. No. 08/736,761, entitled "A METHOD FOR CAPTURING AND CATALOGING PROGRAM CHARACTERISTICS FOR THE USAGE OF DATASTORE PERSISTENT CLASSES," filed on Oct. 25, 1996, by Kenneth R. Blackman and Jack L. Howe III, now U.S. Pat. No. 5,764,979.

all of which applications are incorporated by reference herein.

BACKGROUND OF THE INVENTION

1. Field of the Invention

The present invention relates generally to computerized methods for accessing datastores, and in particular, to a computerized object-oriented method for accessing non-object-oriented datastores.

2. Description of Related Art

It is well known in the art to use database management systems, such as IBM's IMS™ (Information Management System) database management system, to manage computerized datastores. Indeed, IMS™ has been used for decades and remains in use today. Currently, there is a need to access such "legacy" datastores using application programs developed by object-oriented programming systems (OOPS). However, there are few tools available to assist OOPS programmers.

For object-oriented applications to access non-object-oriented datastores, OOPS programmers often need to generate much code to satisfy the constraints of the object-oriented application, the non-object-oriented datastore, and the particular needs of the user. Thus, there is a need in the art for improved tools to facilitate bridging between non-object-oriented datastores and object-oriented application programs and to minimize the need to write code for accessing the external datastore.

SUMMARY OF THE INVENTION

To overcome the limitations in the prior art described above, and to overcome other limitations that will become apparent upon reading and understanding the present specification, the present invention discloses a method, apparatus, and article of manufacture for generating class definitions and implementations for datastore persistent objects. A task guide is displayed on a monitor attached to a computer, wherein the task guide comprises a step-by-step procedure for creating the class specifications and implementations for the datastore persistent objects. User input is accepted into the computer in response to the step-by-step procedure and the class specifications and implementations for the datastore persistent objects are created using the user input.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 2 is a block diagram illustrating a collection of collections data model according to the present invention;

FIGS. 7A–7L are "snapshots" of an IMS Object Connector Class Wizard that comprises at least a portion of a graphical user interface displayed on the monitor of a client computer by the Class Definition Tool in one embodiment of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention captures and catalogs program characteristics for the usage of datastore persistent classes. A computerized system in accordance with the principles of the present invention includes an external non-object-oriented datastore and a class definition tool that defines a datastore persistent object class having methods for wrappering data from the datastore and defines a specification for an application program that interacts with datastore persistent objects.

The class definition tool stores the application program specification in a catalog and augments the application program specification to constrain use of a datastore persistent object by the application program.

The class definition tool further generates sub-schema mapper class definition and method source code using the application program specification.

Hardware Environment

Figure 1:
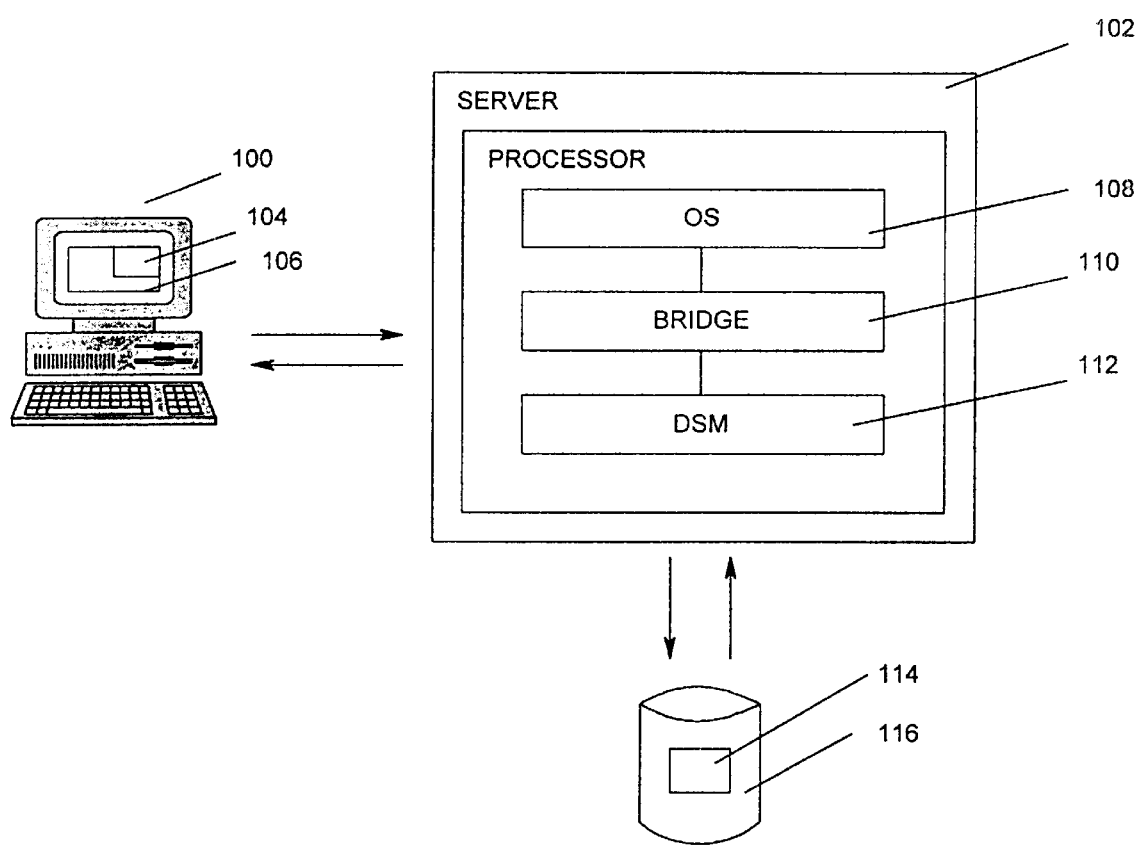
FIG. 1 is a block diagram illustrating an exemplary hardware environment used to implement the preferred embodiment of the present invention.

FIG. 1 is a block diagram illustrating an exemplary hardware environment used to implement the preferred embodiment of the invention. A workstation or terminal 100 communicates with a server computer 102. Both the workstation 100 and the server computer 102 are typically comprised of one or more processors, random access memory (RAM), read-only memory (ROM), and other components such data storage devices and data communications devices.

The workstation 100 executes one or more computer programs 104 operating under the control of an operating system 106, such as the MVS™, VM™, AIX™, OS/2™, Windows™, Macintosh™, AS/400™, or UNIX™ operating systems. These computer programs 104 transmit commands to the server computer 102 for performing various functions and receive data from the server computer 102 in response to the commands.

The server computer 102 also operates under the control of an operating system 108, such as the MVS™, VM™, AIX™, OS/2™, Windows™, Macintosh™, AS/400™ or UNIX™ operating systems. The server computer 102 executes one or more computer programs 110 and 112 under the control of the operating system 108. These computer programs 110 and 112 receive commands from the workstation 100 for performing various functions and transmit data to the workstations 100 in response to the commands.

The server computer 102 manages one or more external databases or datastores 114 stored on one or more data storage devices 116 (such as a fixed or hard disk drive, a floppy disk drive, a CD-ROM drive, a tape drive, or other device). In the preferred embodiment, the external datastore 114 comprises an IMS™ datastore managed by an IMS™ database management system (DBMS) product offered by IBM Corporation. Those skilled in the art will recognize, however, that the present invention may be applied to any datastore and associated database management system.

The present invention is generally implemented using five major components executed by the workstation 100 and the server computer 102, i.e., object-oriented application program 104, workstation operating system 106, server operating system 108, bridge 110, and datastore manager (DSM) 112, wherein each of these components comprise one or more computer programs. The object-oriented application program 104 performs application functions; the workstation operating system 106 controls the operation of the workstation 100; the server operating system 108 controls the operation of the server computer 102; the bridge 110 materializes data retrieved from the external database 114 as objects; and the datastore manager 112 controls access to the external database 114.

Generally, these computer programs 104–112 are all tangibly embodied in or retrievable from a computer-readable medium, e.g., a data storage device or a data communications device. Moreover, the computer programs are all comprised of instructions which, when read and executed by the workstation 100 and/or server computer 102, causes the workstation 100 and/or server computer 102 to perform the steps necessary to implement and/or use the present invention.

Those skilled in the art will recognize that any combination of the above components, or any number of different components, including computer programs, peripherals, and other devices, may be used to implement the present invention, so long as similar functions are performed thereby.

Datastore Model

FIG. 2 is a block diagram illustrating the collection of collections data model used in the present invention. Data retrieved from the non-object-oriented external datastore 114 is modeled as a "collection of object collections" in the bridge 110. Where the external data has a simple structure, each record is encapsulated as an object, which becomes a member of an object collection. Where the records are hierarchical in structure, that hierarchical structure is modeled by creating object collections and then hierarchically connecting the related object collections. Other complex logical records can be modeled as a hierarchy of object collections. A single collection of collections is materialized for each datastore, e.g., the object model of two flat files is a model having two collections of collections.

Block 200 represents the logical hierarchical structure of the data as stored in the external datastore 114, and block 202 represents the logical "collection of object collections" structure created from the data retrieved from the external datastore 114. The bridge 110 translates the data between the differing formats and structures in blocks 200 and 202.

In the logical hierarchical structure of block 200, parent record A (204) has children records B (206) and C (208), and child record C (208) is also a parent of children records D (210) and E (212). There may also be multiple instances of parent record A (214 and 216).

Similarly, in the logical "collection of object collections" structure of block 202, parent object A (218) has children objects B (220) and C (222), and child object C (222) is also a parent of children objects D (224) and E (226). Further, there are multiple instances of parent object A (228 and 230). Each of these objects is a datastore persistent object (DPO) that encapsulates a logical unit of data, i.e., record, retrieved from the non-object-oriented datastore, and includes member functions for manipulating the encapsulated data. Thus, the difference between blocks 200 and 202 is that each record A, B, or C in block 200 is represented by a DPO in block 202, and the hierarchy in block 200 is represented by the collections of object collections in block 202.

Datastore Collection

The bridge 110 manages "datastore collections", which are the foundation of the "collections of object collections"
data model. The members of the datastore collection are the DPOs. The datastore collection also includes a query evaluator having a query syntax and a query parser, a queryable datastore cursor, and an associated result collection with a cursor. For complex queries, queries may be sub-divided. Results for the queries are presented in user-specifiable increments, which permits the delivery of large result collections while controlling use of memory.

Figure 3:
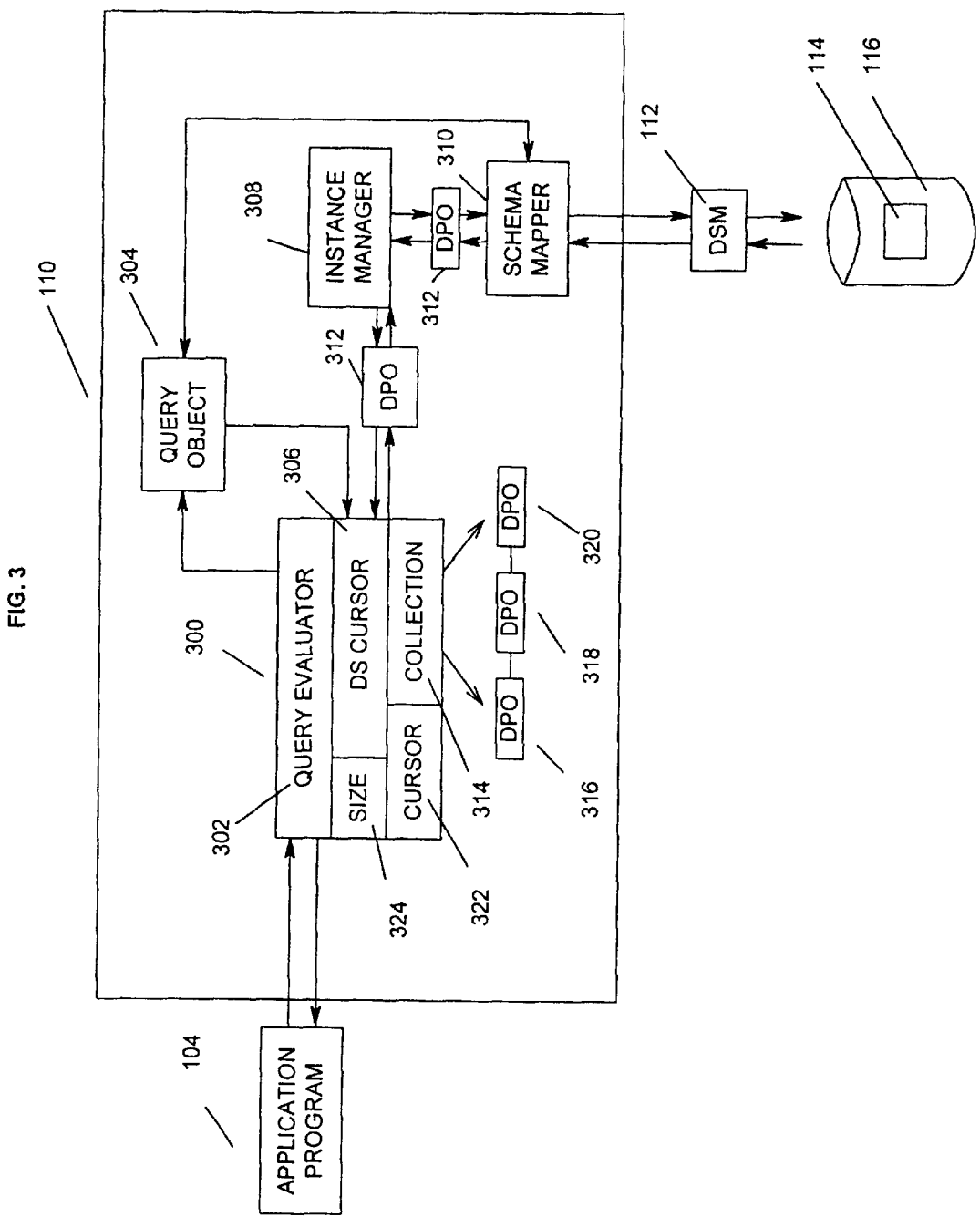
FIG. 3 is a block diagram illustrating an exemplary datastore collection of the bridge according to the present invention.

FIG. 3 is a block diagram illustrating an exemplary datastore collection 300 of the bridge 110 according to the present invention. The datastore collection 300 includes a query evaluator 302 for receiving a query from the application program 104, wherein the query evaluator 302 comprises a query syntax and a query parser. The query evaluator 302 parses the query request in accordance with the query syntax and stores the parsed request in a parse table in a query object 304. A datastore cursor 306 retrieves the parsed query from the query object 304 and provides the parsed query to an instance manager 308, which coordinates requests from the application program 104 with the datastore collection 300 and the external datastore 114. The instance manager 308 uses a schema mapper 310 to interface with the datastore manager 112. The datastore manager 112 retrieves data from the external datastore 114 on the external storage device 116 and returns the requested data to the schema mapper 310. The schema mapper 310 translates common elements between the requested data retrieved from the external datastore 114 and a DPO 312, which results in the requested data being encapsulated in the DPO 312. The schema mapper 310 returns the DPO 312 through the instance manager 308 to the datastore cursor 306 which stores the DPO 312 in the result collection 314. Generally, the result collection 314 comprises one or more DPOs 316, 318, and 320.

The datastore cursor 306 populates the result collection 314 so that the application program 104 can incrementally access the query result. Because the number of data items or records requested by the query may be large, the datastore cursor 306 only populates the result collection 314 with a specified number of DPOs 316, 318, and 320 that correspond to the query request. A pointer to the current DPOs 316, 318, or 320 is maintained by the cursor 322, and the size of the result collection 314 is determined by a size variable 324.

If the application program 104 needs to access more data items or records that satisfy the query, the datastore cursor 306 deletes one or more of the DPOs 316, 318, and 320 from the result collection 314 and requests the instance manager 308, through the schema mapper 310, to retrieve additional DPOs 312, up to the number indicated in the size variable 324, into the result collection 314.

In addition to populating a DPO 312 with data from the external datastore 114, the schema mapper 310 updates the external datastore 114 with changed data from the DPO 312. The schema mapper 310 may add data to the external datastore 114 when a new DPO 312 is created, and the schema mapper 310 may delete corresponding data from the external datastore 114 when a existing DPO 312 is deleted.

The schema mapper 310 translates queries to specific instructions for the datastore manager 112. Generally, these instructions comprise: SELECT, UPDATE, INSERT and DELETE, wherein the SELECT instruction retrieves data from the external datastore 114 via the datastore manager 112 for a DPO 312; the UPDATE instruction, following a SELECT, saves changed data from the DPO 312 into the external datastore 114 via the datastore manager 112; the INSERT instruction saves new data from the DPO 312 into the external datastore 114 via the datastore manager 112; and the DELETE instruction deletes the DPO 312 and its corresponding data from the external datastore 114 via the datastore manager 112.

Datastore Persistent Objects (DPOs)

The members, or elements, of the datastore collection 300 are queryable DPOs 316, 318, and 320 that encapsulate external data, i.e., records retrieved from the external datastore 114, with associated methods to move data with data type integrity between the DPOs 316, 318, and 320, and the records of the external datastore 114. Thus, a DPO 316, 318, and 320 makes non-object-oriented data accessible as "base class objects" that may be used or wrappered by other classes in an object-oriented programming system. Further, the data being encapsulated by the DPO 316, 318, and 320 may or may not be concurrently shared or updated between object-oriented and non-object-oriented applications, depending on the characteristics of the underlying datastore 114.

The bridge 110 thus comprises a queryable persistence implementation that can be used to access data in non-object-oriented datastores 114. The bridge 110 provides a datastore persistent object class to wrapper data retrieved from the external datastore 114, a queryable persistent identifier (PID) used to specify information used to locate the data in the external datastore 114 needed to populate the particular DPO 312, and a schema mapper class used to obtain the required data from the external datastore 114 and translate or transfer it into the format of the particular DPO 312.

Figure 4:
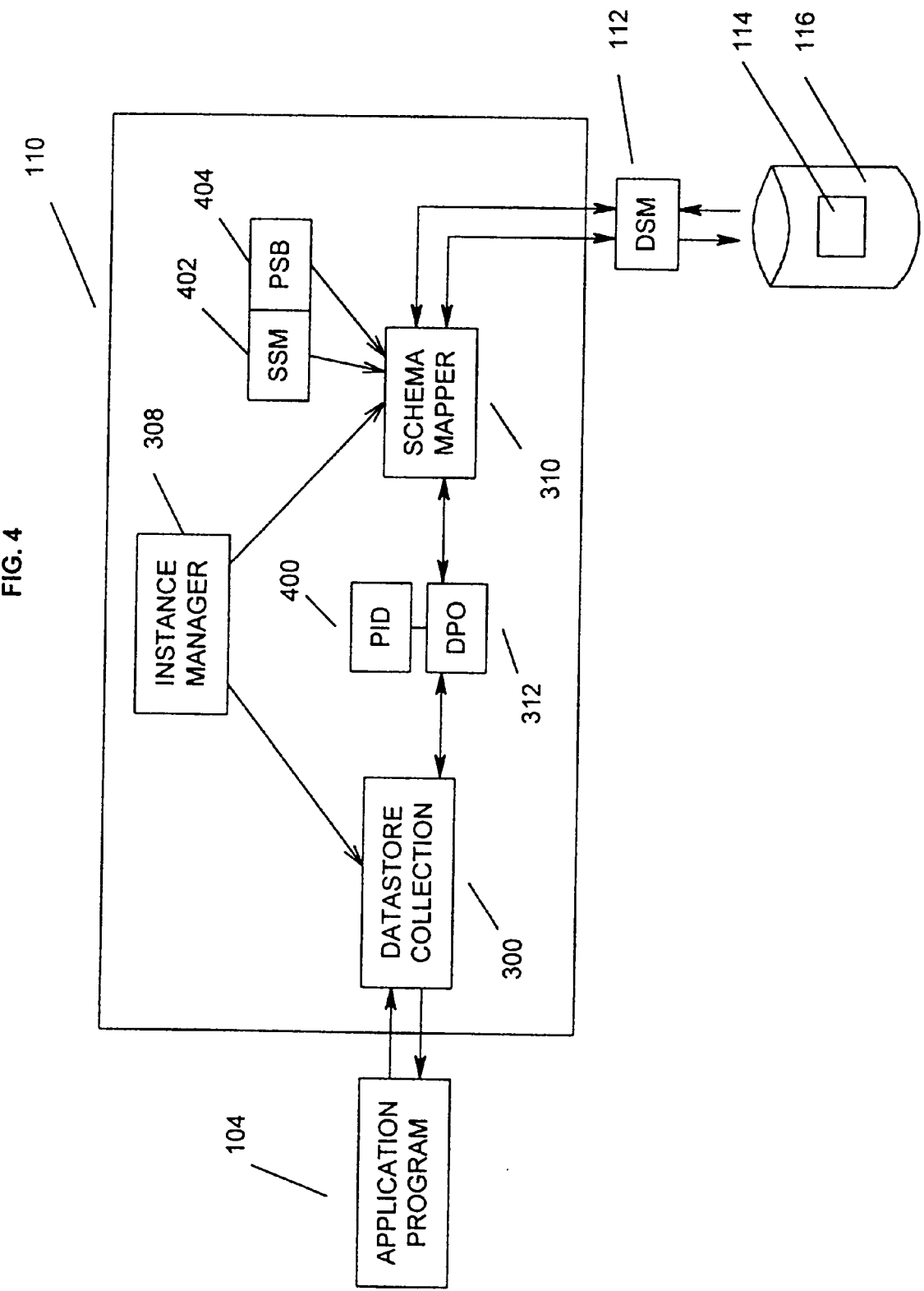
FIG. 4 is a block diagram illustrating the operation of the bridge according to the present invention.

FIG. 4 is a block diagram illustrating the operation of the bridge 110 according to the present invention. The application program 104 passes a query request to the datastore collection 300. The datastore collection 300 evaluates the query and passes control to the datastore cursor 306 for processing. The datastore cursor 306 creates a DPO 312 and its associated PID 400. The PID 400 is used to specify the query information needed to locate the data in the external datastore 114.

The DPO 312 and PID 400 are passed to the instance manager 308 who requests that the schema mapper 310 retrieve the data via the datastore manager 112 for storing into the DPO 312. The schema mapper 310 looks at the DPO's 312 accompanying PID 400 which has information from the query object 304 for locating data. The schema mapper 310 provides the input/output commands to the datastore manager 112 using information from a subschema mapper 402 and program specification block (PSB) 404. The schema mapper 310 receives the located logical unit of data from the datastore manager 112 and maps the located data into the DPO 312, thereby "wrappering" the logical unit of data. Upon completion of the operation, the DPO 312 then encapsulates the data retrieved by the schema mapper 310.

Instance Manager

Figure 5:
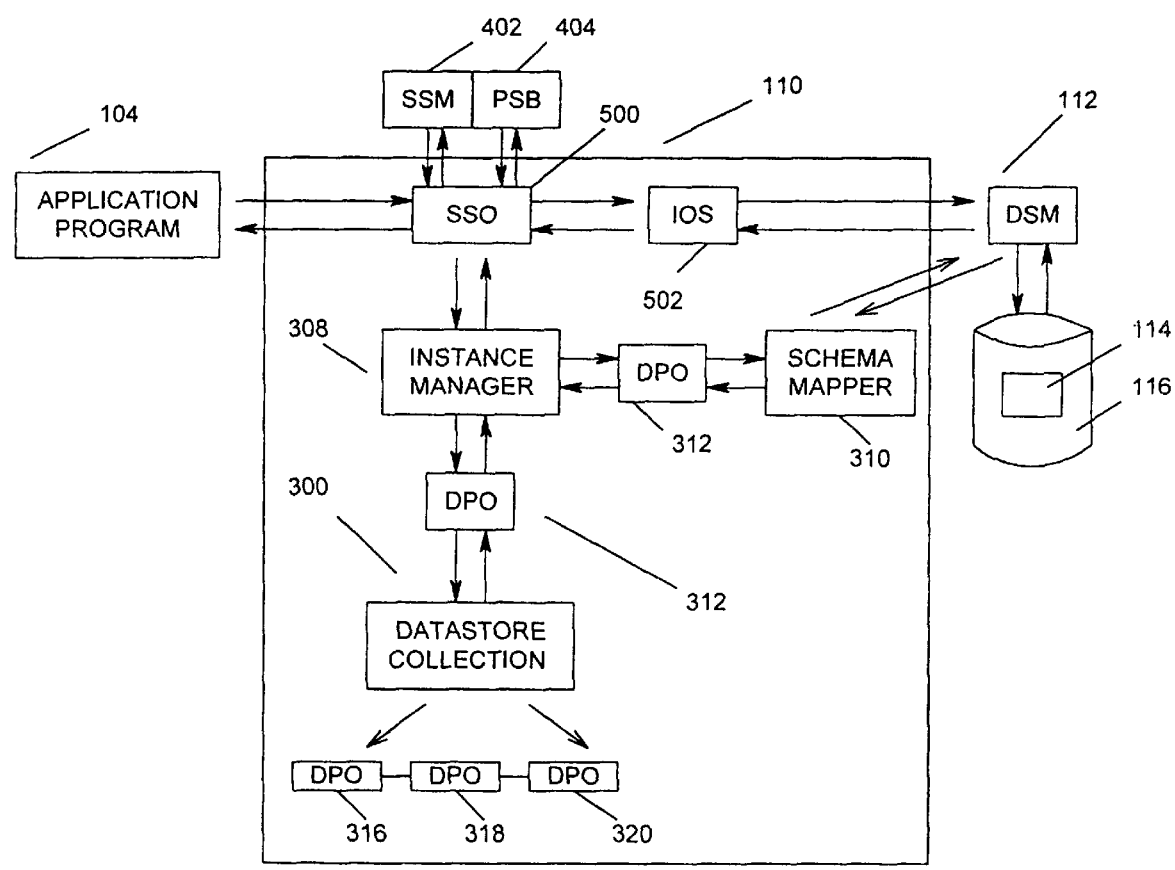
FIG. 5 is a block diagram illustrating the operation of the instance manager of the bridge according to the present invention.

FIG. 5 is a block diagram illustrating the operation of the instance manager 308 according to the present invention.

In the run-time environment, the datastore collections 300 and DPOs 316, 318, and 320 are managed (e.g., created, tracked, materialized, destroyed, and garbage collected) by the instance manager 308. The instance manager 308 also participates in the unit-of-work between the application program 104 being served and the external datastore 114.

Although the interface to the application program 104 remains constant, the level of service provided by the instance manager 308 will vary according to the characteristics of the external datastore 114. The instance manager 308 will exploit the capabilities of the external datastore 114 and the datastore manager 112 wherever possible, e.g., with regard to query functions, concurrency, security, etc.

The instance manager 308 uses service classes to isolate some of its functions, system services object (SSO) 500, interface object services (IOS) 502, and subschema mapper 402. The SSO 500 serves as a "factory" for creating DPO 312 and datastore collections 300 requested by query objects 304. The SSO 500 further serves as a transaction manager for the unit-of-work.

The SSO 500 receives a unit-of-work request from the application program 104. The SSO 500 creates a subschema mapper 402 and opens a PSB 404 for the unit-of-work request. The SSO 500 interfaces to the datastore manager 112 through the IOS 502. The IOS 502 opens and closes the connection to the datastore manager 112.

Using the schema mapper 310, the instance manager 308 populates the datastore collection 300 with DPOs 316, 318, and 320 that encapsulate data retrieved from the external datastore 114 via the datastore manager 112. The schema mapper 310 updates the external datastore 114 with changed data from the DPOs 316, 318, and 320, and adds or deletes the associated elements from the external datastore 114 when the DPOs 316, 318, and 320 are added or deleted.

The SSO 500 propagates a request to complete a unit-of-work to the instance manager 308, the datastore collection 300, the schema mapper 310, and the DPOs 316, 318, and 320, so as to coordinate the requests with the datastore manager 112 to maintain the integrity of the external datastore 114. Upon completion of the unit-of-work, the instance manager 308 deletes the DPOs 316, 318 and 320, the datastore collection 300, and schema mapper 310, from the memory of the server computer 102.

Datastore Class Definition Tool (CDT)

To minimize the need for writing non-object-oriented code to access the non-object-oriented datastore 114, the datastore persistent object classes and methods used in the present invention are generated by a Datastore Class Definition Tool (CDT). At run-time, the bridge 110 instantiates datastore persistent objects for these classes and directs the retrieval of data from the external datastore 114 into the datastore persistent objects.

Figure 6:
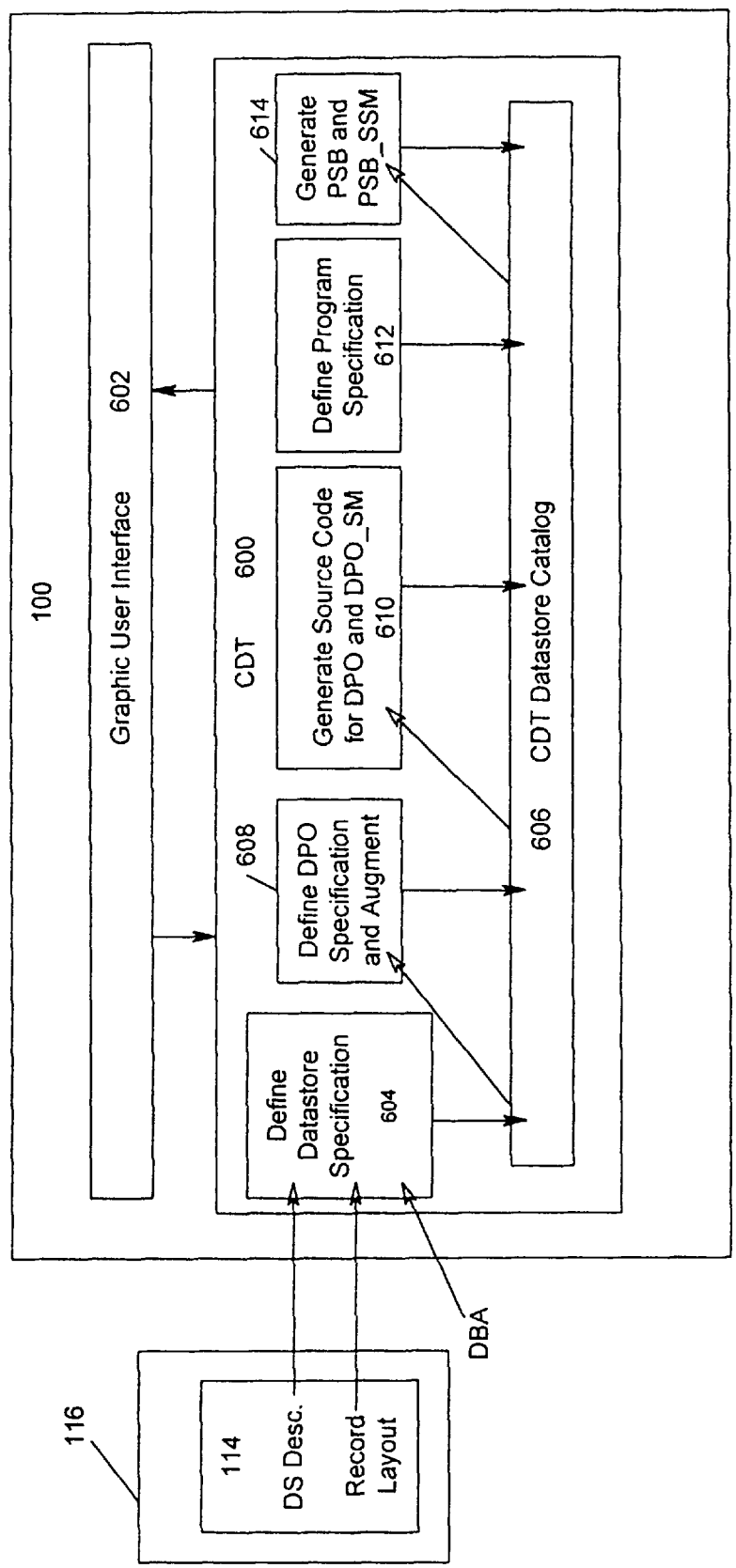
FIG. 6 is a block diagram illustrating the operation of the class definition tool according to the present invention.

FIG. 6 is a block diagram illustrating the operation of the CDT 600 according to the present invention. The CDT 600 executes under the control of the operating system 106 on the workstation 100 and interacts with an operator via a Graphical User Interface (GUI) 602.

A define datastore specification function 604 of the CDT 600 captures information from database descriptions and record layouts, and associates them to one another to define a datastore specification stored in a CDT datastore catalog 606. The database description includes information about the structure of the segments in the external datastore 114 and the record layouts include formatting information for the records in the datastore 114. The database descriptions and record layouts accessed by the CDT 600 are typically located on the server computer 102.

The database description is derived from any source of information about a datastore, such as a database definition (DBD) in an IMS™ datastore, a VSAM™ file description, file definition source files, record definitions, source files, catalogs, repositories, or any other source of datastore information. These files generally define the datastore 114 in terms of size, structure, relationship, associations, data element size and type.

In the preferred embodiment, the record layout is captured from a COBOL "copylib" file used by the application program 104. On the other hand, the record layout may also be captured from other languages, such as C, C++, Assembler, Pascal or PL/1, for example. Capturing a record layout involves parsing the "copylib" to extract field information, including position, type and length.

If the database description or the record layout changes, the define datastore specification function 604 may update the datastore specification stored in the catalog 606 in response to the change.

The define datastore specification function 604 that associates the database description with the record layout can either be done automatically by the CDT 600 or in response to a command from a Database Administrator (DBA). An example of automatic association would be the CDT 600 associating database description names with record layout names; alternatively, the DBA could manually enter such associations into the CDT 600. The resulting datastore specification contains the relevant information extracted from the database description and the record layout, and links the database description and record layout together. The define datastore specification function 604 may further perform an augment function that captures additional information to assist in defining the datastore specification. Examples of this additional information are date formats, range of values, sets of values, trigger fields, null values, foreign keys, partial keys, optimistic locking indicators, required fields for insert, calculated fields, child/dependent datastore persistent objects, etc.

A define datastore persistent object specification function 608 of the CDT 600 uses the datastore specification in the CDT datastore catalog 606 and DBA input to define a datastore persistent object specification, which is then stored in the CDT datastore catalog 606. In the preferred embodiment, the define datastore persistent object specification function 608 of the CDT 600 performs functions of naming the datastore persistent object class, accepting operator input that describes the datastore persistent object class, and identifying characteristics of the datastore source, e.g. fields in a record or fields in a segment. The define datastore persistent object specification function 608 may further perform an augment function that captures additional information to assist in defining the datastore persistent object specification and to constrain the use of datastore persistent objects. Examples of this additional information are date formats, range of values, sets of values, trigger fields, null values, foreign keys, partial keys, optimistic locking indicators, required fields for insert, calculated fields, child/dependent datastore persistent objects, etc.

A generate datastore persistent object specification source code function 610 of the CDT 600 uses the datastore persistent object specification to generate source code for the datastore persistent class and its associated schema mapper class. The source code includes both class definitions and method implementations for the classes. The code generated by the CDT 600 is compiled, linked, and made available in executable form at run-time.

The define program specification function 612 of the CDT 600 captures characteristics of the object-oriented application program 104 to be executed on the workstation 100 as a program specification, which is stored in the CDT datastore catalog 606. The define program specification function 612 provides information about the object-oriented application program 104 that is useful in generating subschema mapper class definition and method source code and PSB source code. The define program specification function 612 of the CDT 600 may further perform an augment function that captures additional information to assist in defining the program specification. In the preferred embodiment, the define program specification function 612 performs the functions of identifying the object-oriented application program 104, providing descriptive text about the object-oriented application program 104, identifying the datastore persistent objects used by the object-oriented application program 104, and capturing characteristics related to the use of the datastore persistent objects (e.g., whether concurrent access to objects is required, whether the application program will update and delete objects, etc.) by the application program 104.

The generate program specification source code function 614 of the CDT 600 generates source code for PSBs and paired subschema mapper class definitions and methods. The code generated by the CDT 600 is compiled, linked, and made available in executable form at run-time. Generally, the PSBs are macro-assembler statements, e.g., System/360 assembler language for IMS™ datastores 114, that define the datastores 114 and segments accessible to application programs 104.

As is known in the art, a PSB comprises one or more program control blocks (PCB) for an IMS™ datastore 114. A PCB is a control statement that names the IMS™ datastore 114 being accessed and the processing options. More specifically, the PCB enumerates the segment names that may be accessed and their processing options.

Operation of the IMS Object Connector Class Wizard

FIGS. 7A–7L are "snapshots" of an IMS Object Connector Class Wizard, also known descriptively as a "task guide", that comprises at least a portion of the GUI 602 displayed on the monitor of the client computer 100 by the CDT 600 in one embodiment of the present invention. These snapshots illustrate an exemplary sequence of events during the operation of the IMS Object Connector Class Wizard 602.

The IMS Object Connector Class Wizard 602 of the present invention provides an improved GUI for the CDT 600. The IMS Object Connector Class Wizard 602 simplifies the creation and/or use of the CDT datastore catalog 606. As a result, the IMS Object Connector Class Wizard 602 improves application programmer productivity.

The IMS Object Connector Class Wizard 602 is displayed whenever the CDT 600 is executed. The CDT 600 displays an initial page for the IMS Object Connector Class Wizard 602, as shown in FIG. 7A.

Figure 7A:

The initial page of FIG. 7A is an introduction page for the IMS Object Connector Class Wizard 602. This page is the beginning of the a step-by-step procedure for creating the CDT datastore catalog 606. Along the left side of the page as checkboxes, wherein the checkboxes are "Ichecked" as each step is completed. Prior to beginning the steps, the operator should be familiar with the IMS database definition (DBD) files and COBOL copylib files defining the targeted IMS databases.

The page includes four buttons, including the Back, Next, Done, and Help buttons, which perform the following functions: (1) return to the previous step by selecting the Back button; (2) proceed to the next step by selecting the Next button; (3) terminate the Wizard by selecting the Done button; and (4) display "Help" information by selecting the Help button.

Figure 7B:
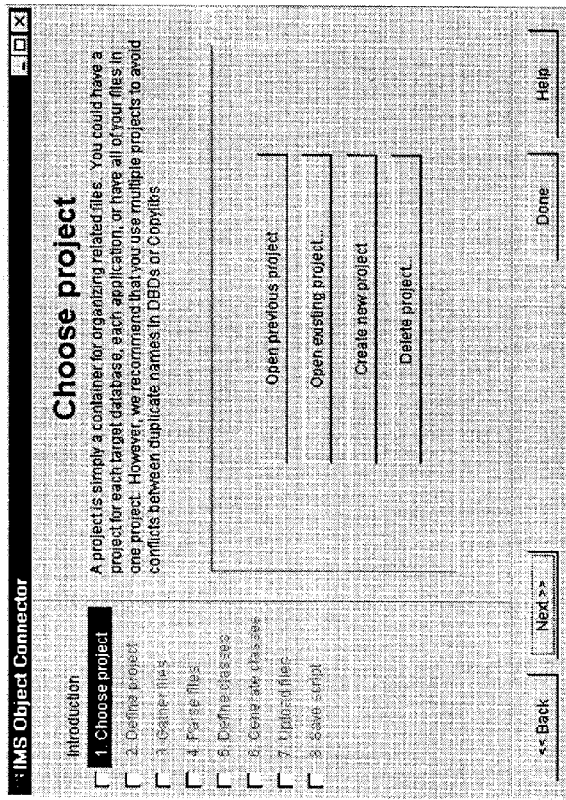

After selecting the Next button, the "Choose Project" page of FIG. 7B is displayed on the monitor of the client computer 100. A project is a folder or container within the CDT datastore catalog 606 for organizing related files. The user could have a project for each target database, each application, or one project for all files. Generally, the user should use multiple projects to avoid conflicts between duplicate names in the DBDs or COBOL copylibs.

The page includes eight buttons, including the Open previous project, Open existing project, Create new project, Delete project, Back, Next, Done, and Help buttons, which perform the following functions: (1) open a previous project; (2) open an existing project; (3) create a new project; (4) delete a project; (5) return to the previous step by selecting the Back button; (6) proceed to the next step by selecting the Next button; (6) terminate the Wizard by selecting the Done button; and (8) display "Help" information by selecting the Help button.

Figure 7C:
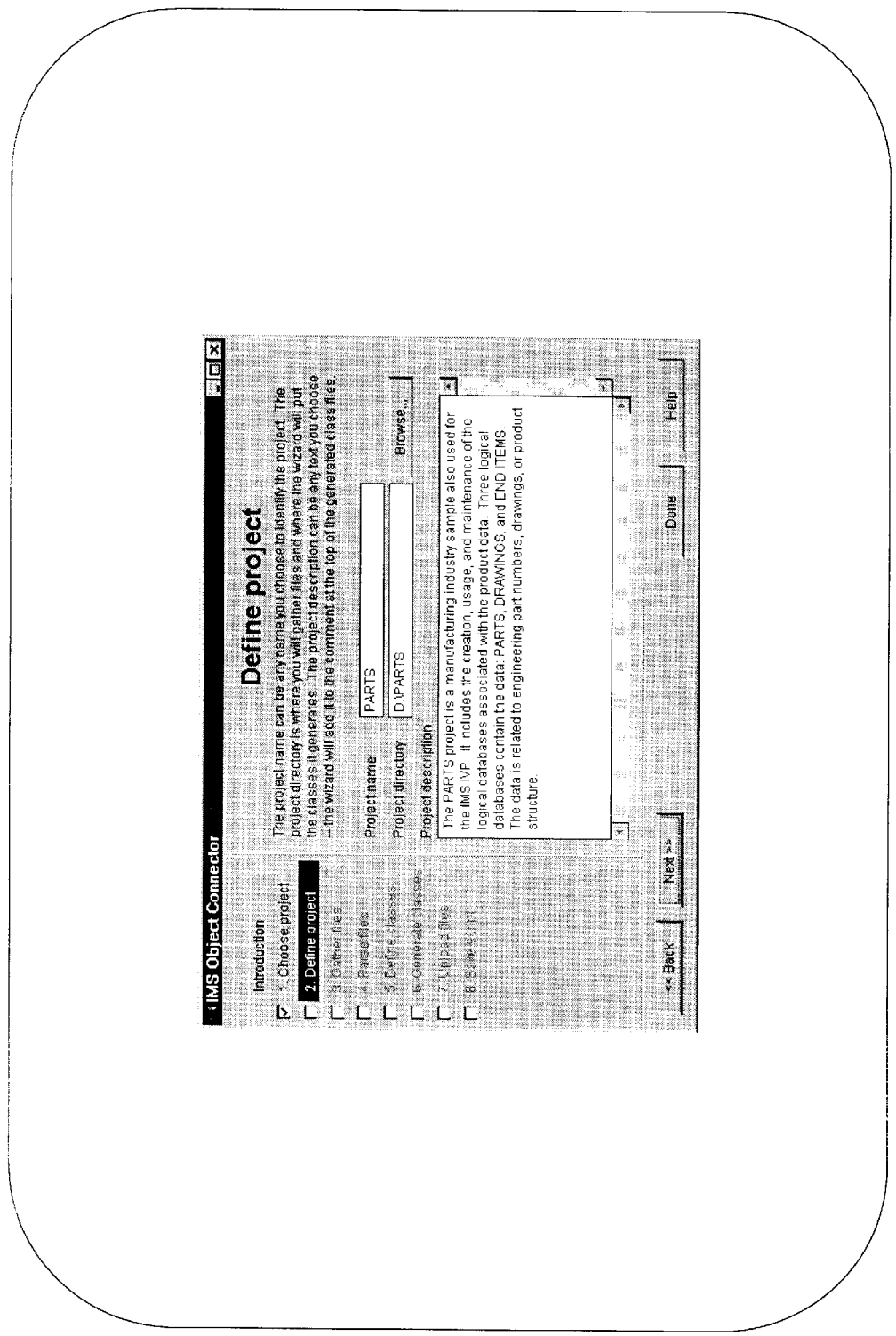

After selecting the Next button, the "Define Project" page of FIG. 7C is displayed on the monitor of the client computer 100. This page is used by the user to define the project name, project directory, and project description. The project name is any name used to identify the project; the project directory is a subdirectory where the files for the project are gathered; and the project description is any text chosen by the user, wherein the text is added to the top of the generated class source code.

The page includes three fields for specifying the project name, project directory, and project description, and four buttons, including the Back, Next, Done, and Help buttons, which perform the following functions: (1) return to the previous step by selecting the Back button; (2) proceed to the next step by selecting the Next button; (3) terminate the Wizard 602 by selecting the Done button; and (4) display "Help" information by selecting the Help button.

Figure 7D:
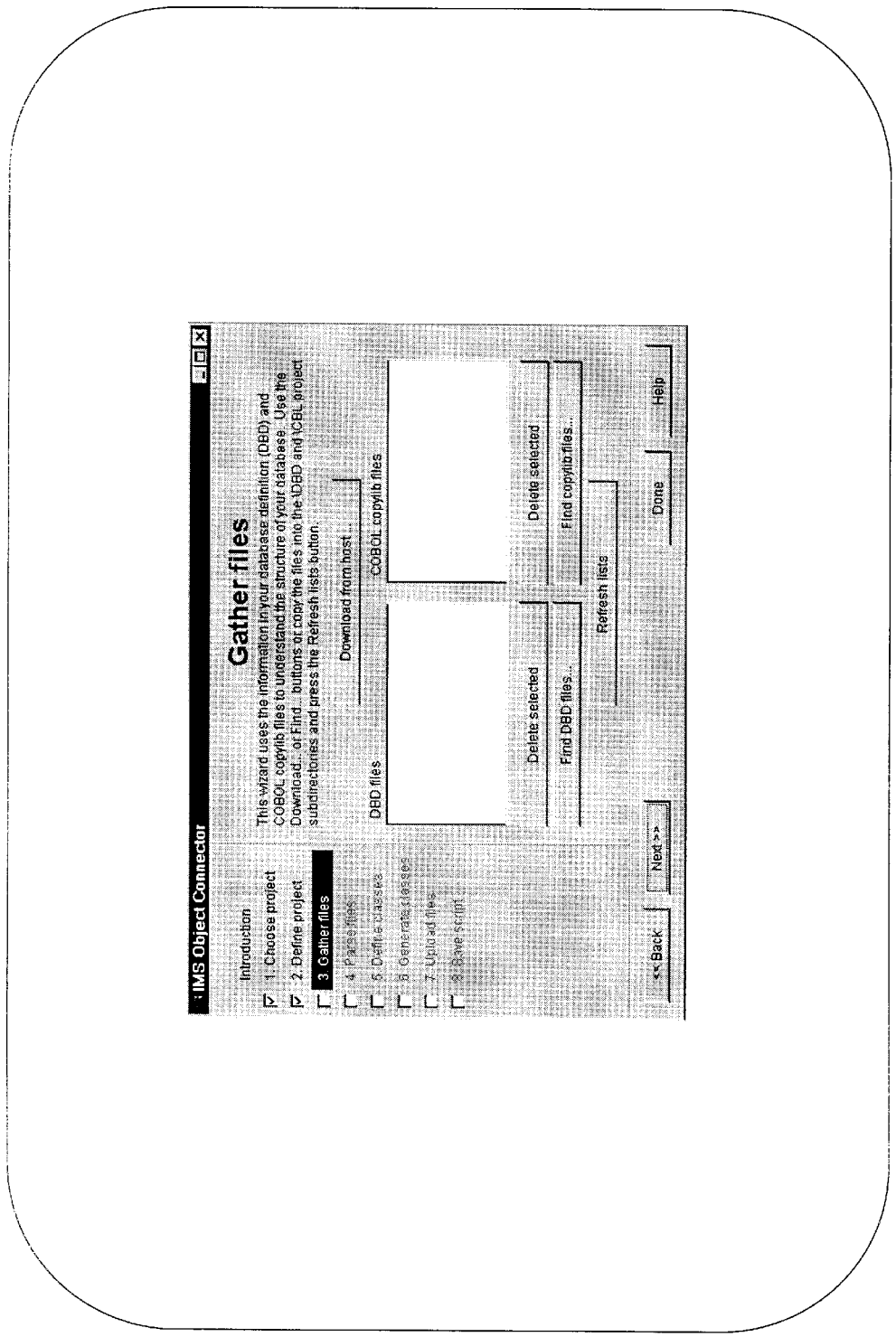

After selecting the Next button, the "Gather Files" page of FIG. 7D is displayed on the monitor of the client computer 100. This page provides the user interface for the define datastore specification function 604 and is used by the user to specify the DBD files and COBOL copylib files to be used by the CDT 600 and stored in the CDT datastore catalog 606.

The page includes two list boxes for the DBD files and COBOL copylib files, respectively, and ten buttons, including the Download from host, Deleted selected (DBD files), Find DBD files, Delete selected (COBOL Copylib files), Find copylib files, Refresh lists, Back, Next, Done, and Help buttons, which perform the following functions: (1) download files from the server 102; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard by selecting the Done button; and (10) display "Help" information by selecting the Help button.

Figure 7E:
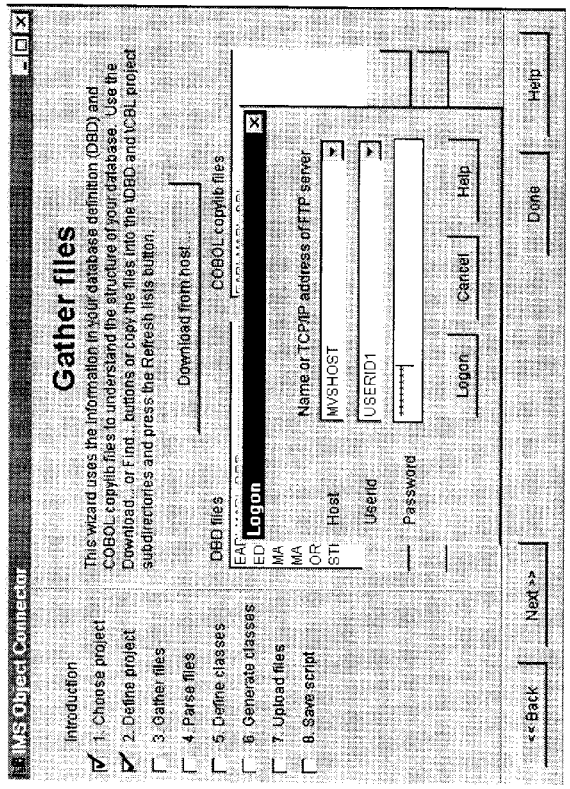

After selecting the Download from host button, the Logon page of FIG. 7E is displayed on the monitor of the client computer 100. This page also provides the user interface for the define datastore specification function 604 and is used by the user to connect the server 102 for downloading the DBD files and COBOL copylib files to be stored in the CDT datastore catalog 606 by the CDT 600.

Figure 7F:
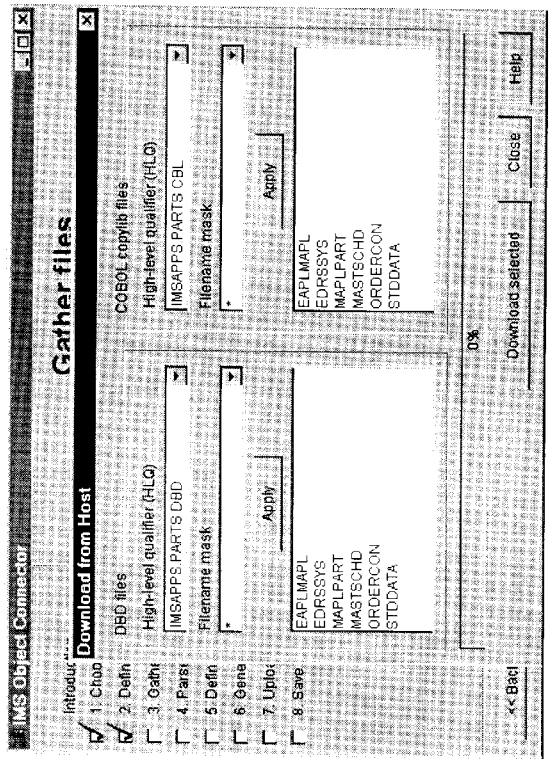

After entering the host, userid, and password data in the three fields indicated in FIG. 7E, and selecting the Logon button, the Download from Host page of FIG. 7F is displayed on the monitor of the client computer 100. This page is used by the user to identify and select the DBD files and COBOL copylib files on the server 102 to be downloaded, stored, and used by the CDT 600.

The page includes two groups of three list boxes, wherein one group comprises list boxes to specify a high-level qualifier and search mask for DBD files and list the resulting DBD files and the other group comprises list boxes to specify a high-level qualifier and search mask for COBOL copylib files and list the resulting COBOL copylib files. The page also includes five buttons, including the Apply (DBD files), Apply (COBOL copylib files), Download selected, Close, and Help buttons, which perform the following functions: (1) apply the specified high-level qualifier and search mask to a search for DBD files and list the resulting DBD files; (2) apply the specified high-level qualifier and search mask to a search for COBOL copylib files and list the resulting COBOL copylib files; (3) download any selected files in the lists of DBD files and COBOL copylib files; (4) close the page; and (5) display "Help" information by selecting the Help button.

Figure 7G:
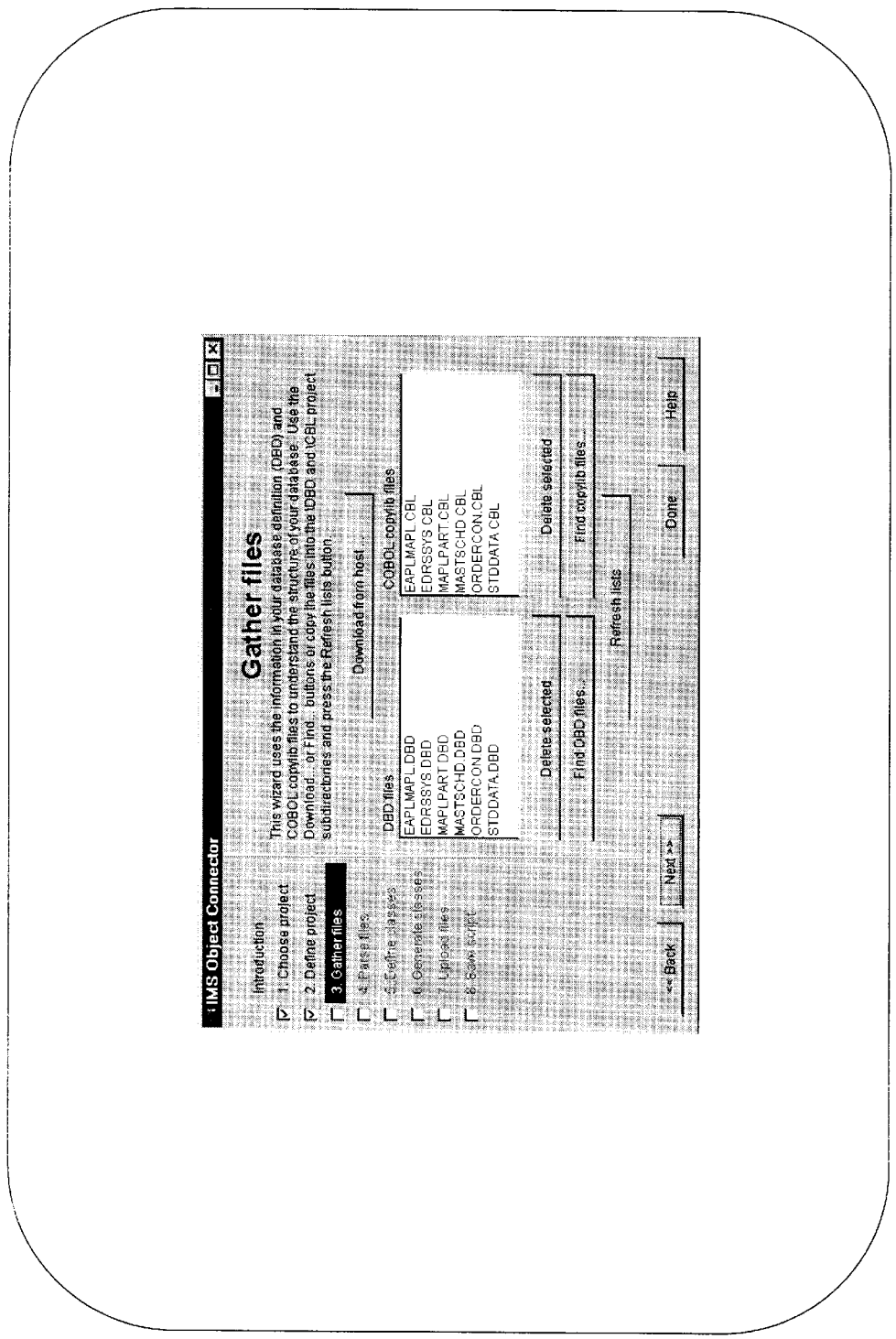

After selecting the Download selected button, the "Gather Files" page of FIG. 7G is displayed on the monitor of the client computer 100. After downloading any selected files in the lists of DBD files and COBOL copylib files from FIG. 7F, the list boxes in this page include the selected DBD files and COBOL copylib files stored in the CDT datastore catalog 606 that are to be used by the CDT 600.

As indicated above, the page includes ten buttons, including the Download from host, Deleted selected (DBD files), Find DBD files, Delete selected (COBOL Copylib files), Find copylib files, Refresh lists, Back, Next, Done, and Help buttons, which perform the following functions: (1) download files from the server 102 into the CDT datastore catalog 606; (2) deleted the selected DBD files from the list above the button; (3) find DBD files; (4) delete selected COBOL Copylib files from the list above the button; (5) find copylib files; (6) refresh both the DBD file list and COBOL copylib file list; (7) return to the previous step by selecting the Back button; (8) proceed to the next step by selecting the Next button; (9) terminate the Wizard by selecting the Done button; and (10) display "Help" information by selecting the Help button.

Figure 7H:
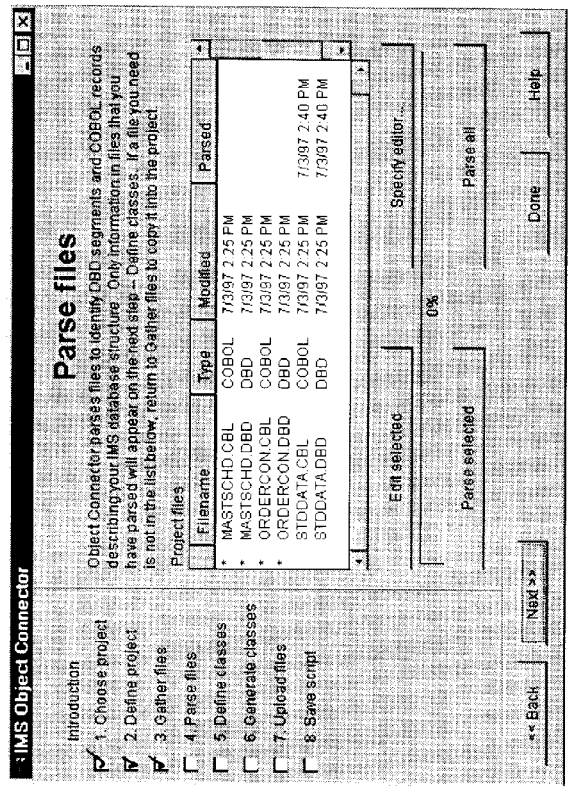
Figure 71:
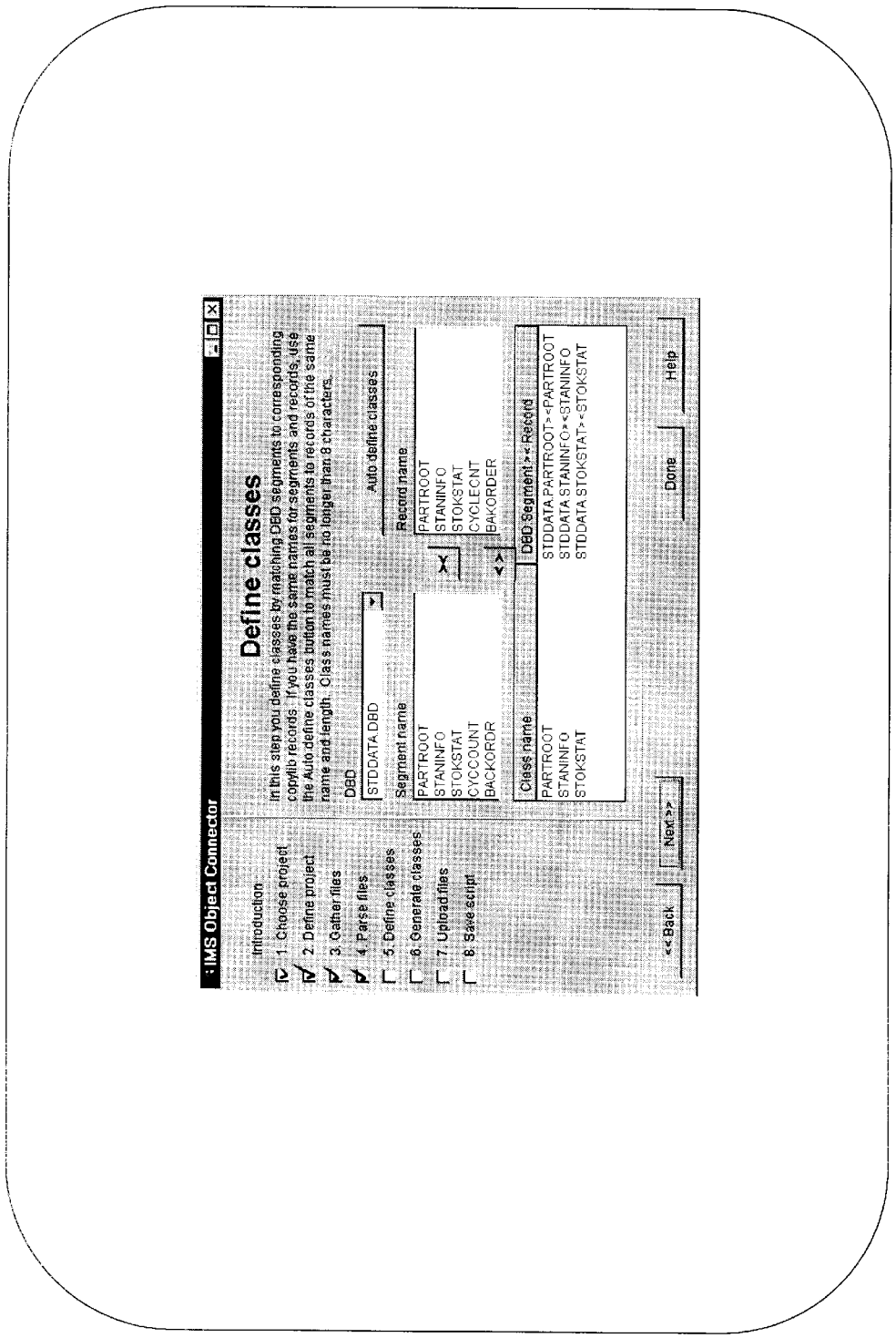

After selecting the Next button, the "Parse files" page of FIG. 7H is displayed on the monitor of the client computer 100. This page also provides the user interface for the define datastore specification function 604 and is used by the user to specify the DBD files and COBOL copylib files from the CDT datastore catalog 606 to be used by the CDT 600. The CDT 600 parses the selected files to identify DBD segments and COBOL records describing the IMS database structure. Only information in files that are parsed are defined as classes.

The page includes a list box of selected files and eight buttons, including the Edit selected, Specify editor, Parse selected, Parse all, Back, Next, Done, and Help buttons, which perform the following functions: (1) edit selected DBD files and COBOL copylib files; (2) specify the editor to use in step (1); (3) parse the selected files from the list box; (4) parse all of the files from the list box; (5) return to the previous step by selecting the Back button; (6) proceed to the next step by selecting the Next button; (7) terminate the Wizard by selecting the Done button; and (8) display "Help" information by selecting the Help button. The page also includes a "progress" bar above both parse buttons to indicate the progress being made by either of the parse functions.

After selecting the Next button, the "Define classes" page of FIG. 7I is displayed on the monitor of the client computer 100. This page provides the user interface for the define datastore specification function 604 and is used by the user to define classes by matching segments from the DBD files to corresponding records from the COBOL copylib files. If the same names are used for the segments and records, an "auto-define" function can be used to perform the matching function.

The page includes a list box of selected DBD files, a list box of segment names, a list box of record names, and a list box of class names. The page also includes seven buttons, including the Auto define classes, >< (associate names), <> (disassociate names), Back, Next, Done, and Help buttons, which perform the following functions: (1) auto-define the classes; (2) associate the names between the segment name and record name list boxes; (3) disassociate the names between the segment name and record name list boxes; (4) return to the previous step by selecting the Back button; (5) proceed to the next step by selecting the Next button; (6) terminate the Wizard by selecting the Done button; and (7) display "Help" information by selecting the Help button.

Figure 7J:
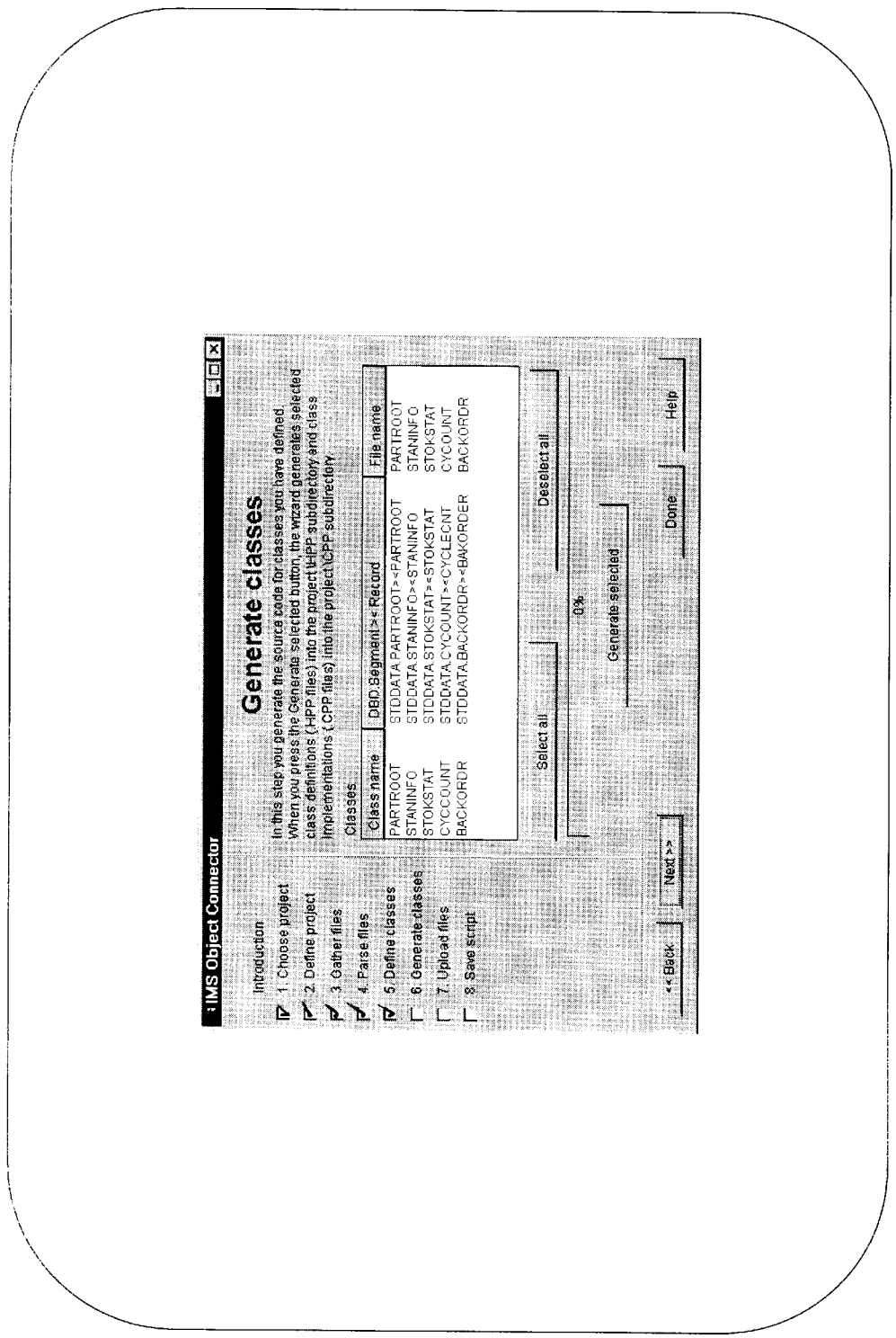

After selecting the Next button, the "Generate classes" page of FIG. 7J is displayed on the monitor of the client computer 100. This page provides the user interface for the generate datastore persistent object specification function 610 and the define program specification function 612, and is used to generate the source code for classes defined by matching segments from the DBD files to corresponding records from the COBOL copylib files. When the Generate button is selected, the Wizard 602 generates selected class definitions (.HPP files) into the "project\HPP" subdirectory and class implementations (.CPP files) into the "project\CPP" subdirectory.

The page includes a list box of class names, related segment names and record names, file names for the generated source code. The page also includes seven buttons, including the Select all, Deselect all, Generate selected, Back, Next, Done, and Help buttons, which perform the following functions: (1) select all the classes in the list box; (2) deselect all the classes in the list box; (3) generate the class definitions for the selected classes; (4) return to the previous step by selecting the Back button; (5) proceed to the next step by selecting the Next button; (6) terminate the Wizard by selecting the Done button; and (7) display "Help" information by selecting the Help button. The page also includes a "progress" bar above the Generate selected button to indicate the progress being made in generating the class definitions for the selected classes.

Figure 7K:
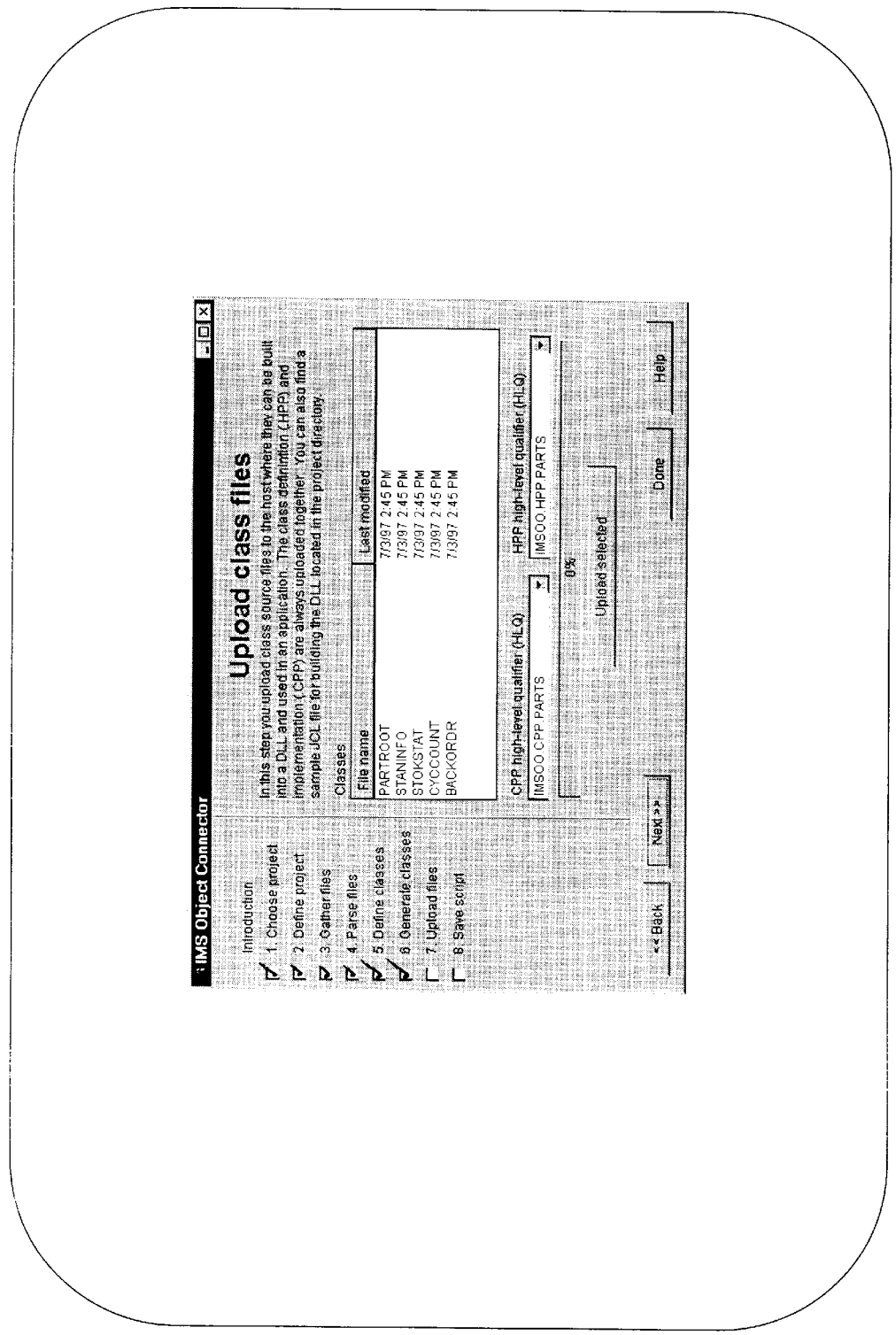

After selecting the Next button, the "Upload class files" page of FIG. 7K is displayed on the monitor of the client computer 100. This page is used to upload the source code for the class definitions and implementations from the CDT datastore catalog 606 to the server 102, where they can be compiled into a runtime DLL that forms a part of the bridge 110 (e.g., the schema mapper 310) for interfacing to the application program 104. Related class definitions (.HPP files) and class implementations (.CPP files) are uploaded together. Sample JCL (Job Control Language) for compiling the source code into the runtime DLL for the bridge 110 is also located in the project directory.

The page includes a list box of file names for related class definitions (.HPP files) and class implementations (.CPP files), and list boxes for specifying a high-level qualifier for the .CPP files and for specifying a high-level qualifier for the .HPP files. The page also includes five buttons, including the Upload selected, Backs Next, Done, and Help buttons, which perform the following functions: (1) uploaded the class definitions (.HPP files) and class implementations (.CPP files) for the selected file name in the list box; (2) return to the previous step by selecting the Back button; (3) proceed to the next step by selecting the Next button; (4) terminate the Wizard by selecting the Done button; and (5) display "Help" information by selecting the Help button. The page also includes a "progress" bar above the Upload selected button to indicate the progress being made in uploading the class definitions (.HPP files) and class implementations (.CPP files) for the selected file name.

Figure 7L:
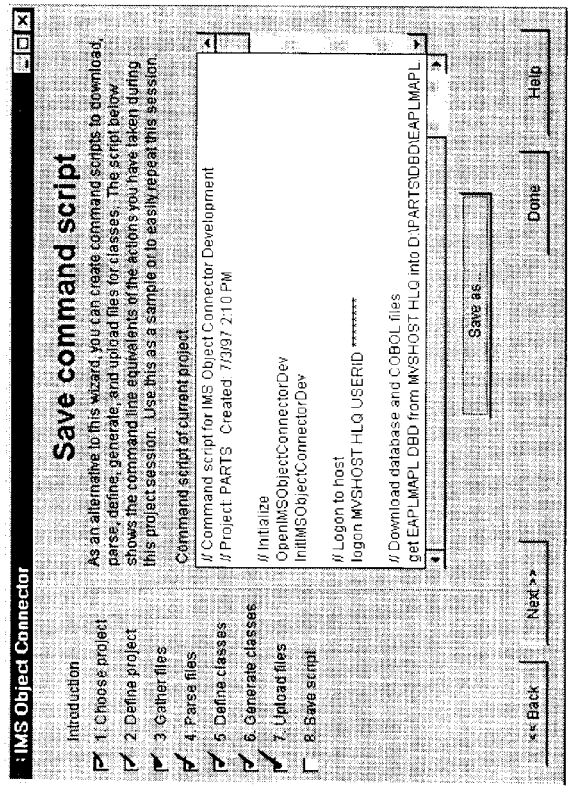

After selecting the Next button, the "Save command script" page of FIG. 7L is displayed on the monitor of the client computer 100. This page is used to create command scripts, as an alternative to using the IMS Object Connector Class Wizard 602, for performing the above downloading, parsing, defining, generating and uploading steps related to the construction of class definitions and implementations.

The page includes a text area showing the command script for the current project, wherein the text area includes vertical and horizontal scroll bars. The page also includes five buttons, including the Save as, Back, Next, Done, and Help buttons, which perform the following functions: (1) save the command script as a specified file; (2) return to the previous step by selecting the Back button; (3) proceed to the next step by selecting the Next button; (4) terminate the Wizard by selecting the Done button; and (5) display "Help" information by selecting the Help button.

Logic of the IMS Object Connector Class Wizard

Figure 8:
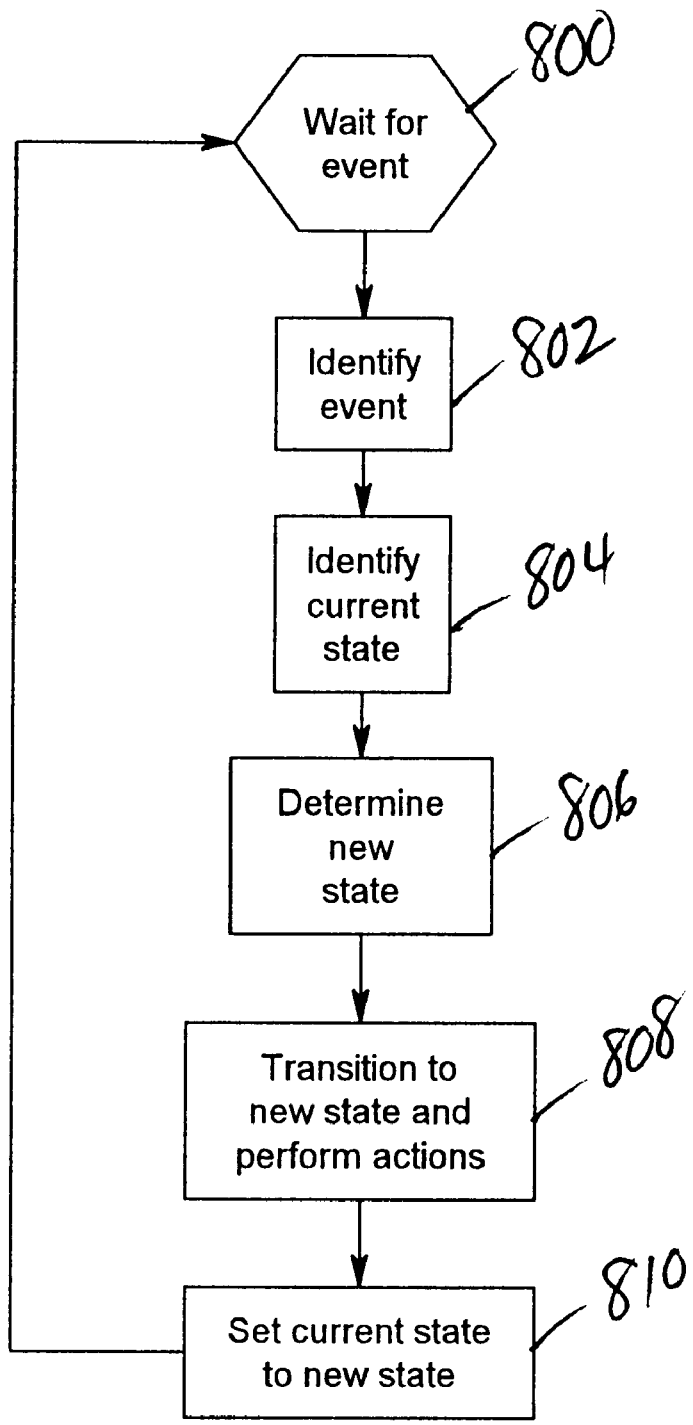
FIG. 8 is a flowchart that illustrates the general logic of a message or event-driven Class Definition Tool performing the steps of the present invention.
Figure 9:
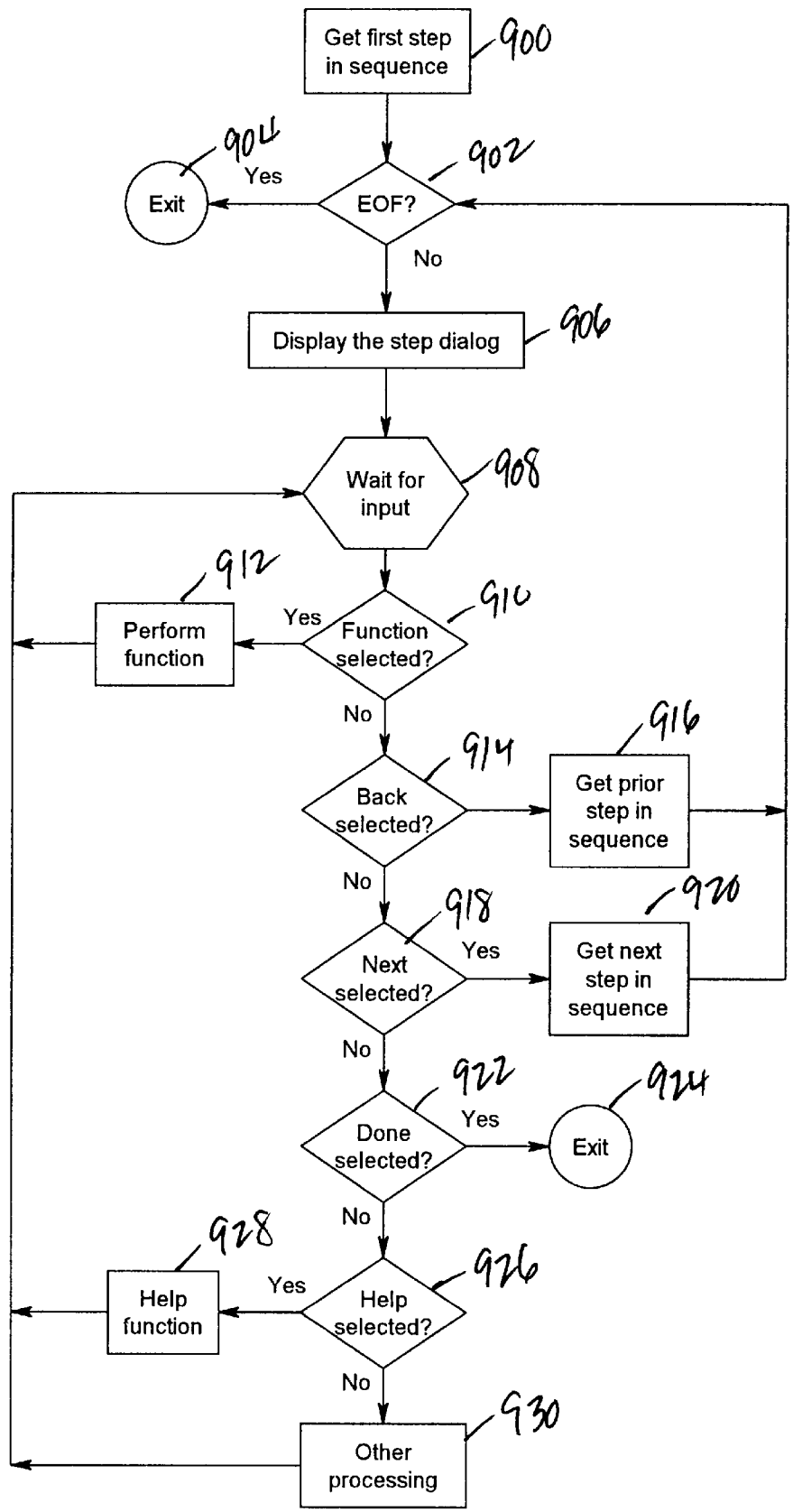
FIG. 9 is a flowchart that illustrates the general logic to perform a sequence of steps for the IMS Object Connector Class Wizard.

Flowcharts which illustrate the logic of the IMS Object Connector Class Wizard 602 of the present invention are shown in FIGS. 8 and 9. Those skilled in the art will recognize that this logic is provided for illustrative purposes only and that different logic may be used to accomplish the same results.

In the preferred embodiment, the various operations described below are specifically related to the IMS Object Connector Class Wizard 602 of the CDT 600. Of course, those skilled in the art will recognize that other functions could be used in the IMS Object Connector Class Wizard 602 without departing from the scope of the present invention.

FIG. 8 is a flowchart that illustrates the general logic of a message or event-driven CDT 600 performing the steps of the present invention. In such a CDT 600, operations are performed when transitions are made, based upon the receipt of messages or events, from present or current states to new states.

Generally, the flowchart begins by waiting at block 800 for an event (e.g., a mouse button click). It should be appreciated that during this time, other tasks, e.g., by the operating system or other computer programs, may also be carried out. When an event occurs, control passes to block 802 to identify the event. Based upon the event, as well as the current state of the system determined in block 804, a new state is determined in block 806. In block 808, the logic transitions to the new state and performs any actions required for the transition. In block 810, the current state is set to the previously determined new state, and control returns to block 800 to wait for more input events.

The specific operations that are performed by block 808 when transitioning between states will vary depending upon the current state and the event. The various operations required to implement and maintain the IMS Object Connector Class Wizard 602 of the present invention represent particular events handled by the logic. However, it should be appreciated that these operations represent merely a subset of all of the events handled by the computer 100.

FIG. 9 is a flowchart that illustrates the general logic to perform a sequence of steps for the IMS Object Connector Class Wizard 602. The logic begins at block 900 when control transfers from FIG. 8 after the IMS Object Connector Class Wizard 602 is invoked or selected by the user. Block 900 represents the computer 100 retrieving the first step in the sequence of pages (e.g., FIG. 7A) associated with the IMS Object Connector Class Wizard 602. Block 902 is a decision block that represents the computer 100 determining whether there are no more steps in the sequence associated with the IMS Object Connector Class Wizard 602. If so, control transfers to Block 904 to terminate the logic of the IMS Object Connector Class Wizard 602; otherwise, control transfers to Block 906.

Block 906 represents the computer 100 displaying the step page on the monitor. Block 908 represents the computer 100 waiting for user input (e.g., a mouse button click signifying selection of a function). Thereafter, control passes to blocks 910–930 to identify the input and perform associated functions.

Block 910 is a decision block that represents the computer 100 determining whether the user input is a function selected from the step page. If so, control transfers to Block 912; otherwise, control transfers to Block 914. Block 912 represents the computer 100 performing the selected function, e.g., any of the functions or group of functions described above in conjunction with FIGS. 7A–7K excluding the functions associated with the Back, Next, Done, and Help buttons. Thereafter, control transfers back to Block 908.

Block 914 is a decision block that represents the computer 100 determining whether the user input is a "Back" function selected from the page. If so, control transfers to Block 916; otherwise, control transfers to Block 918. Block 916 represents the computer 100 retrieving the prior step page in the sequence. Thereafter, control transfers back to Block 902.

Block 918 is a decision block that represents the computer 100 determining whether the user input is a "Next" function selected from the page. If so, control transfers to Block 920; otherwise, control transfers to Block 922. Block 920 represents the computer 100 retrieving the next step page in the sequence. Thereafter, control transfers back to Block 902.

Block 922 is a decision block that represents the computer 100 determining whether the user input is a "Done" function selected from the page. If so, control transfers to Block 924; otherwise, control transfers to Block 926. Block 924 represents the computer 100 terminating the logic of the IMS Object Connector Class Wizard 602.

Block 926 is a decision block that represents the computer 100 determining whether the user input is a "Help" function selected from the page. If so, control transfers to Block 928; otherwise, control transfers to Block 930. Block 928 represents the computer 100 performing the Help function. Thereafter, control transfers back to Block 908.

Block 930 represents the computer 100 performing other processing for other user input. Thereafter, control transfers back to Block 908.

Conclusion

This concludes the description of the preferred embodiment of the invention. The following paragraphs describe some alternative methods of accomplishing the same objects.

In alternative embodiments of the present invention, other types and configurations of computers could be used.

For example, the invention need not be restricted to client-server configurations. In addition, mainframes, minicomputers, or personal computers could be used with the present invention.

In alternative embodiments of the present invention, other types and configurations of computer programs could be used. For example, the invention need not be restricted to client-server configurations.

In alternative embodiments of the present invention, other database management systems could be used. For example, the invention need not be restricted to IMS™ database management systems. In addition, the present invention could be used to model other types of information.

In summary, the present invention discloses a method, apparatus, and article of manufacture for generating class definitions and implementations for datastore persistent objects. A "wizard" or "task guide" is displayed on a monitor attached to a computer, wherein the wizard comprises a step-by-step procedure for creating the class specifications and implementations for the datastore persistent objects. User input is accepted into the computer in response to the step-by-step procedure and the class specifications and implementations for the datastore persistent objects are created using the user input.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating class definitions and implementations for datastore persistent objects, comprising the steps of:

(a) displaying a task guide on a monitor attached to a computer, wherein the task guide comprises a step-by-step procedure for creating the class specifications and implementations for the datastore persistent objects; and (b) accepting user input into the computer in response to the step-by-step procedure and creating the class specifications and implementations for the datastore persistent objects using the user input.

2. The method of claim 1 above, further comprising the steps of displaying a user interface on the monitor and accepting user input via the displayed user interface to organize the class specifications and implementations for the datastore persistent objects by project.

3. The method of claim 1 above, wherein the class specifications and implementations for the datastore persistent objects are defined using IMS Database Definition (DBD) files and COBOL copylib files defining one or more targeted IMS databases.

4. The method of claim 3 above, further comprising the steps of displaying a user interface on the monitor and accepting user input via the displayed user interface to specify the DBD files and COBOL copylib files to be used to define the class specifications and implementations for the datastore persistent objects.

5. The method of claim 3 above, further comprising the steps of displaying a user interface on the monitor and accepting user input via the displayed user interface to specify the host computer to identify and download the DBD files and COBOL copylib files to be used to define the class specifications and implementations for the datastore persistent objects.

6. The method of claim 5 above, wherein the user interface allows the user to specify a qualifier and search mask for the DBD files and COBOL copylib files.

7. The method of claim 3 above, further comprising the steps of displaying a user interface on the monitor and accepting user input via the displayed user interface to specify the DBD files and COBOL copylib files to parse to identify DBD segments and COBOL copylib records describing the IMS databases, wherein the parsed files are used to define the class specifications and implementations for the datastore persistent objects.

8. The method of claim 7 above, wherein the user interface allows the user to edit the DBD files and COBOL copylib files.

9. The method of claim 3 above, further comprising the steps of displaying a user interface on the monitor and accepting user input via the displayed user interface to match DBD segments to corresponding COBOL copylib records, wherein the matched DBD segments and COBOL copylib records are used to define the class specifications and implementations for the datastore persistent objects.

10. The method of claim 9 above, wherein the user interface allows the user to automatically match the DBD segments to corresponding COBOL copylib records.

11. The method of claim 9 above, further comprising the steps of displaying a user interface on the monitor and accepting user input via the displayed user interface to generate source code for the class definitions and implementations defined by the matching DBD segments and COBOL copylib records.

12. The method of claim 11 above, further comprising the steps of displaying a user interface on the monitor and accepting user input via the displayed user interface to upload the source code for the class definitions and implementations to a server, where the source code is compiled for use in accessing the IMS datastores.

13. A computerized apparatus for generating class definitions and implementations for datastore persistent objects, comprising:

a computer having a monitor attached thereto; and means, executed by the computer, for displaying a task guide on the monitor, wherein the task guide comprises a step-by-step procedure for creating the class specifications and implementations for the datastore persistent objects, and for accepting user input into the computer in response to the step-by-step procedure and creating the class specifications and implementations for the datastore persistent objects using the user input.

14. An article of manufacture comprising a computer program carrier embodying one or more computer programs that, when executed by a computer, causes the computer to perform method steps for generating class definitions and implementations for datastore persistent objects, the method comprising the steps of:

(a) displaying a task guide on a monitor attached to the computer, wherein the task guide comprises a step-by-step procedure for creating the class specifications and implementations for the datastore persistent objects; and (b) accepting user input into the computer in response to the step-by-step procedure and creating the class specifications and implementations for the datastore persistent objects using the user input.

15. The apparatus of claim 13 above, further comprising means for displaying a user interface on the monitor and for accepting user input via the displayed user interface to organize the class specifications and implementations for the datastore persistent objects by project.

16. The apparatus of claim 13 above, wherein the class specifications and implementations for the datastore persistent objects are defined using IMS Database Definition (DBD) files and COBOL copylib files defining one or more targeted IMS databases.

17. The apparatus of claim 16 above, further comprising means for displaying a user interface on the monitor and for accepting user input via the displayed user interface to specify the DBD files and COBOL copylib files to be used to define the class specifications and implementations for the datastore persistent objects.

18. The apparatus of claim 16 above, further comprising means for displaying a user interface on the monitor and for accepting user input via the displayed user interface to specify the host computer to identify and download the DBD files and COBOL copylib files to be used to define the class specifications and implementations for the datastore persistent objects.

19. The apparatus of claim 18 above, wherein the user interface allows the user to specify a qualifier and search mask for the DBD files and COBOL copylib files.

20. The apparatus of claim 16 above, further comprising means for displaying a user interface on the monitor and for accepting user input via the displayed user interface to specify the DBD files and COBOL copylib files to parse to identify DBD segments and COBOL copylib records describing the IMS databases, wherein the parsed files are used to define the class specifications and implementations for the datastore persistent objects.

21. The apparatus of claim 20 above, wherein the user interface allows the user to edit the DBD files and COBOL copylib files.

22. The apparatus of claim 16 above, further comprising means for displaying a user interface on the monitor and for accepting user input via the displayed user interface to match DBD segments to corresponding COBOL copylib records, wherein the matched DBD segments and COBOL copylib records are used to define the class specifications and implementations for the datastore persistent objects.

23. The apparatus of claim 22 above, wherein the user interface allows the user to automatically match the DBD segments to corresponding COBOL copylib records.

24. The apparatus of claim 22 above, further comprising means for displaying a user interface on the monitor and for accepting user input via the displayed user interface to generate source code for the class definitions and implementations defined by the matching DBD segments and COBOL copylib records.

25. The apparatus of claim 24 above, further comprising means for displaying a user interface on the monitor and for accepting user input via the displayed user interface to upload the source code for the class definitions and implementations to a server, where the source code is compiled for use in accessing the IMS datastores.

26. The method of claim 14 above, further comprising the steps of displaying a user interface on the monitor and accepting user input via the displayed user interface to organize the class specifications and implementations for the datastore persistent objects by project.

27. The method of claim 14 above, wherein the class specifications and implementations for the datastore persistent objects are defined using IMS Database Definition (DBD) files and COBOL copylib files defining one or more targeted IMS databases.

28. The method of claim 27 above, further comprising the steps of displaying a user interface on the monitor and accepting user input via the displayed user interface to specify the DBD files and COBOL copylib files to be used to define the class specifications and implementations for the datastore persistent objects.

29. The method of claim 27 above, further comprising the steps of displaying a user interface on the monitor and accepting user input via the displayed user interface to specie the host computer to identify and download the DBD files and COBOL copylib files to be used to define the class specifications and implementations for the datastore persistent objects.

30. The method of claim 29 above, wherein the user interface allows the user to specify a qualifier and search mask for the DBD files and COBOL copylib files.

31. The method of claim 27 above, further comprising the steps of displaying a user interface on the monitor and accepting user input via the displayed user interface to specify the DBD files and COBOL copylib files to parse to identify DBD segments and COBOL copylib records describing the IMS databases, wherein the parsed files are used to define the class specifications and implementations for the datastore persistent objects.

32. The method of claim 31 above, wherein the user interface allows the user to edit the DBD files and COBOL copylib files.

33. The method of claim 27 above, further comprising the steps of displaying a user interface on the monitor and accepting user input via the displayed user interface to match DBD segments to corresponding COBOL copylib records, wherein the matched DBD segments and COBOL copylib records are used to define the class specifications and implementations for the datastore persistent objects.

34. The method of claim 33 above, wherein the user interface allows the user to automatically match the DBD segments to corresponding COBOL copylib records.

35. The method of claim 34 above, further comprising the steps of displaying a user interface on the monitor and accepting user input via the displayed user interface to generate source code for the class definitions and implementations defined by the matching DBD segments and COBOL copylib records.

36. The method of claim 35 above, further comprising the steps of displaying a user interface on the monitor and accepting user input via the displayed user interface to upload the source code for the class definitions and implementations to a server, where the source code is compiled for use in accessing the IMS datastores.

* * * * *

UNITED STATES PATENT AND TRADEMARK OFFICE
CERTIFICATE OF CORRECTION

PATENT NO. : 5,924,101
DATED : July 13, 1999
INVENTOR(S) : Mark Alan Bach et al.

It is certified that error appears in the above-identified patent and that said Letters Patent is hereby corrected as shown below:

Column 10,
Line 56, "'Ichecked'" should read -- "checked" --.

Column 14,
Line 1, "Backs" should read -- Back, --.

Column 19,
Line 12, "specie" should read -- specify --.

Signed and Sealed this

Seventh Day of September, 2004

JON W. DUDAS
*Acting Director of the United States Patent and Trademark Office*